(12) United States Patent
Matsuoka et al.

(10) Patent No.: US 6,264,018 B1
(45) Date of Patent: Jul. 24, 2001

(54) LOCKUP DEVICE OF A TORQUE CONVERTER

(75) Inventors: Yoshihiro Matsuoka, Neyagawa; Hiroshi Tsue, Daitou; Naohisa Sugawara, Shijonawate, all of (JP)

(73) Assignee: Exedy Corporation, Osaka (JP)

(*) Notice: Subject to any disclaimer, the term of this patent is extended or adjusted under 35 U.S.C. 154(b) by 0 days.

(21) Appl. No.: 09/493,151

(22) Filed: Jan. 28, 2000

(30) Foreign Application Priority Data

Feb. 9, 1999 (JP) .................................................. 11-031721
May 13, 1999 (JP) .................................................. 11-133220

(51) Int. Cl.[7] .................................................. F16H 45/02
(52) U.S. Cl. .................................................. 192/3.29
(58) Field of Search .................... 192/3.29, 3.3; 464/66, 67, 68

(56) References Cited

U.S. PATENT DOCUMENTS

| | | | |
|---|---|---|---|
| 4,478,323 | * 10/1984 | Weissenberger | 192/3.3 |
| 5,669,475 | 9/1997 | Matsuoka | 192/3.29 |
| 5,695,028 | 12/1997 | Fukushima | 192/3.27 |
| 5,918,713 | 7/1999 | Shimizu et al. | 192/3.29 |
| 5,964,329 | 10/1999 | Kawaguchi et al. | 192/3.3 |
| 6,053,292 | * 4/2000 | Macdonald | 192/3.3 X |
| 6,142,272 | * 11/2000 | Meisner et al. | 192/3.29 |
| 6,155,392 | * 12/2000 | Kundermann | 192/3.3 |

FOREIGN PATENT DOCUMENTS 58-193966 * 11/1983 (JP) .................................................. 192/3.29

* cited by examiner

Primary Examiner—Rodney H. Bonck
(74) Attorney, Agent, or Firm—Shinjyu Global IP Counselors, LLP

(57) ABSTRACT

A torque converter 1 is provided with a lockup device 4 having a simplified structure. Damper mechanism 40 has a drive member 54, a driven member 53 and a torsion spring 52. Piston 38 has an inner peripheral surface rotatably and axially movably supported on the outer peripheral surface of the driven member 53. The piston 38 is non-rotatably and axially movably coupled to the front cover 2. The piston 38 has an inner diameter S that is larger than an outer diameter of the damper mechanism 40. The piston 38 is arranged radially outside the damper mechanism 40. A seal ring 67 is disposed between the outer peripheral surface of the driven member 53 and the inner peripheral surface of the piston 38 for sealing spaces on its axially opposite sides from each other.

20 Claims, 17 Drawing Sheets

LOCKUP DEVICE OF A TORQUE CONVERTER

BACKGROUND OF THE INVENTION

1. Field of the Invention

This invention generally relates to a lockup device for a torque converter. More specifically, the present invention relates to a lockup device provided with a damper mechanism that is axially movable together with a piston.

2. Background Information

Torque converters usually include a fluid coupling mechanism for transmitting torque between the crankshaft of an engine and the input shaft of an automatic transmission. A torque converter has three types of runners (impeller, turbine, stator) located inside for transmitting the torque by means of an internal hydraulic oil or fluid. The impeller is fixedly coupled to the front cover that receives the input torque from the power input shaft. The hydraulic chamber formed by the impeller shell and the front cover is filled with hydraulic oil. The turbine is disposed opposite the front cover in the hydraulic chamber. When the impeller rotates, the hydraulic oil flows from the impeller to the turbine, and the turbine rotates. As a result, the torque is transmitted from the turbine to the main drive shaft of the transmission.

Generally, a torque converter can perform smooth acceleration and deceleration because it transmits a power via fluid. However, an energy loss occurs due to slip of the fluid, resulting in low fuel consumption.

Accordingly, in recent years to improve fuel efficiency, some of the conventional torque converters have included a lock-up device for mechanically coupling a front cover on an input side and a turbine on an output side. Specifically, the lockup device is disposed in a space between the front cover and the turbine. When the torque converter reaches predetermined operating conditions, the lock-up device of the torque converter causes power from the crankshaft of an engine to be directly transmitted to the automatic transmission, and thus, bypassing the fluid coupling device.

The lock-up clutch primarily includes a disk-like piston a driven plate attached to the power output side of the turbine and a damper mechanism that connects the piston to the driven plate. The piston carries an annular friction member adhered to a position opposed to a flat friction surface of the front cover. The piston is disposed to divide the space between the front cover and the turbine into a first hydraulic chamber on the front cover side and a second hydraulic chamber on the turbine side. As a result, the piston can move close to and away from the front cover by the pressure difference between the first hydraulic chamber and the second hydraulic chamber. When the hydraulic oil in the first hydraulic chamber is drained and the hydraulic pressure in the second hydraulic chamber increases in pressure, the piston moves toward the front cover side. This movement of the piston causes the piston to strongly press against the front cover.

Upon engagement lock-up devices often cause a shudder, or vibration. Further, while engaged, the lock-up device is subject to vibrations caused by sudden acceleration, or deceleration, or other vibration including circumstances associated with internal combustion engines. Consequently, a torsional vibration dampening apparatus is typically employed in lock-up device to dampen vibration.

The damper mechanism of a conventional lockup device includes a drive member fixedly coupled to the piston, a driven member fixedly coupled to the turbine side, and an elastic member (one or more torsion springs) disposed in between the drive member and the driven member to enable torque transmission. The damper mechanism functions as a torsional vibration dampening mechanism to dampen vibration in the lock-up clutch. The drive member is supplied with a torque, e.g., from a clutch coupling portion. The driven member can output the torque to a turbine. The torsion springs elastically couple the drive member and the driven member together in the rotating direction to form a damping mechanism. The damper mechanism is axially movable and acts as a piston of the lockup device. More specifically, the inner peripheral surface of the driven member is non-rotatably engaged with a splined turbine hub for preventing relative rotation and allowing axial movement. As a result, the driven member is non-rotatable and axially movable with respect to the splined turbine hub. The driven member is radially positioned with respect to the turbine hub.

In the conventional lockup device, the operation of the piston is controlled by the working fluid flowing through the main unit of the torque converter. More specifically, a hydraulic operation mechanism in an external position supplies the working fluid to a space between the piston and the front cover when the lockup device is disengaged. This working fluid flows radially outward through the space between the front cover and the piston, and then flows from its radially outer portion into the main unit of the torque converter. When the lockup device is engaged, the working fluid in the space between the front cover and the piston is drained from its radially inner portion so that the piston moves toward the front cover. Thereby, the friction member arranged on the piston is pressed against the friction surface of the front cover. In this manner, the torque of the front cover is transmitted to the turbine via the lockup device.

The conventional lockup device may employ a multi-disk clutch for using multiple friction plates and thereby multiple friction surfaces because only one friction surface cannot provide a sufficient torque transmission capacity in some cases. In this case, one or more plates are disposed between the piston and the front cover.

Certain types of prior art lockup devices are provided with a special annular chamber for supporting the piston. This structure increases the number of parts, and impedes reduction in required space.

Moreover, the lockup device of the torque converter is typically disposed in an axially restricted space within the torque converter.

Meanwhile, the damper mechanism is required to have a higher performance by increasing a transmission torque for operation from a low speed range of a vehicle. In recent years, such a torque converter has been known that the torque transmission via fluid is performed only when starting the vehicle, and the lockup device is engaged in a speed range of 10 Km/h or more. In this structure having an increased lockup range, it has been desired to improve the performance of the torsion springs so that torsional vibrations due to torque variations of an engine can be sufficiently absorbed and damped. More specifically, it has been required to increase the diameter of the torsion spring of the damper mechanism, and thereby improve the characteristics of absorbing and damping the vibrations.

In the conventional lockup device, however, the size of the torsion spring cannot be increased sufficiently, for example, by such a reason that another member is arranged on an axially one side of the torsion spring.

In view of the above, there exists a need for a lockup device which overcomes the above mentioned problems in the prior art. This invention addresses this need in the prior art as well as other needs, which will become apparent to those skilled in the art from this disclosure.

SUMMARY OF THE INVENTION

An object of the invention is to simplify the structure for supporting the piston in the lockup device of the torque converter.

An object of the invention is to improve the performance of the damper mechanism in the lockup device of the torque converter provided with the piston and the damper mechanism.

A lockup device according to a first aspect is used in a torque converter including a front cover provided at its inner side with a friction surface, an impeller forming a fluid chamber together with the front cover, and a turbine disposed in the fluid chamber, opposed to the impeller and cooperating with the front cover to form a space therebetween. The lockup device is disposed in the space for mechanically engaging and disengaging the front cover with respect to the turbine in accordance with changes in hydraulic pressure in the space. The lockup device includes a plate, a damper mechanism and an annular piston. The plate is disposed near a friction surface of the front cover. The damper mechanism is a mechanism for elastically coupling the plate and the turbine in the rotating direction. The damper mechanism includes a drive member receiving a torque from the plate, a driven member outputting the torque to said turbine, and a torsion spring elastically coupling said drive member and said driven member together in the rotating direction. The piston is axially movable in the space in accordance with changes in pressure in the space, and is disposed on the side of said plate remote from the front cover friction surface. The driven member is a disk-like member, and the piston has an inner peripheral surface rotatably and axially movably supported by the outer peripheral surface of the driven member. The lockup device further includes a seal mechanism. The seal mechanism is disposed between the outer peripheral surface of the driven member and the inner peripheral surface of the piston for sealing a position between the axially opposite spaces.

In this lockup device, when the piston pushes the plate against the front cover friction surface, a torque is supplied from the front cover to the lockup device. The torque is transmitted from the plate to the damper mechanism, and is output to the turbine. In the damper mechanism, the torque is transmitted from the drive member to the driven member via the torsion spring. The inner peripheral surface of the piston is supported by the outer peripheral surface of the driven member, and the seal mechanism is arranged in the supported portion for sealing the position between the axially opposite spaces. Since the outer peripheral surface of the driven member is used for supporting the inner peripheral surface of the piston, a structure for disposing the seal mechanism can be simple.

According to a second aspect of the invention, the lockup device of the torque converter of the first aspect further has such a feature that the driven member is provided at its outer peripheral surface with an annular groove. The seal mechanism is an annular seal member disposed in the groove and being in contact with the inner peripheral surface of the piston.

In this lockup device, since the groove for accommodating the annular seal member is formed in the outer peripheral surface of the driven member, the groove can be formed easily. This is because the driven member can have a larger axial thickness than the other members.

According to a third aspect of the invention, the lockup device of the torque converter of the first or second aspect further has such a feature that the driven member is provided with a window and a circumferentially long recess. The torsion spring is disposed in the window. The drive member is formed of a pair of circular plates arranged on the axially opposite sides of the driven member, respectively, and supporting the torsion spring. The lockup device further includes a fixing member. The fixing member extends circumferentially in the recess, and fixes the pair of circular plates together. A relative rotation between the drive and driven members stops when the fixing member comes into contact with a circumferential end of the recess.

In this lockup device, the fixing member which fixes the paired circular plates together functions also as a stop in the lockup device. This structure is allowed owing to the structure in which the driven member supports the piston. The piston may be supported, e.g., by the drive member in contrast to the structure of the invention. In this case, the fixing member must be disposed radially outside the inner peripheral surface of the piston. In this structure, the fixing member cannot be increased in size to an extent allowing the use thereof as a stop due to restrictions in space.

A lockup device according to a fourth aspect of the present invention is used in a torque converter including a front cover provided at its inner side with a friction surface, an impeller forming a fluid chamber together with the front cover, and a turbine disposed in the fluid chamber, opposed to the impeller and cooperating with the front cover to form a space therebetween. The lockup device is disposed in the space for mechanically engaging and disengaging the front cover with respect to the turbine in accordance with changes in hydraulic pressure in the space. The lockup device includes a plate, a damper mechanism and a piston. The plate is disposed near a friction surface of the front cover. The damper mechanism is a mechanism for elastically coupling the plate and the turbine in the rotating direction. The piston can move in the space in accordance with changes in pressure in the space. The piston is an annular member disposed on the side of the plate remote from the front cover friction surface. The piston is unrotatably and axially movably coupled to the front cover. The piston has an inner diameter larger than an outer diameter of the damper mechanism, and is arranged radially outside the damper mechanism.

According to this lockup device, the piston rotates together with the front cover, whereby the lockup device can have the two friction surfaces. Further, the piston has the inner diameter larger than the outer diameter of the damper mechanism, and the piston is arranged radially outside the damper mechanism. Therefore, the axial size of the torsion spring in the damper mechanism can be increased. This facilitates designing, and can achieve high performance such as a low rigidity of the torsion spring.

According to a fifth aspect of the present invention, the lockup device of the torque converter of the first aspect further has such a feature that the inner peripheral surface of the piston is unrotatably and axially movably supported by one of the plate and the drive member. In this lockup device, since the piston is supported by a portion of the damper mechanism, neither a special member nor a special mechanism is required for supporting the piston.

According to a sixth aspect of the present invention, the lockup device of the torque converter of the second aspect further has such a feature that a pressure space is formed between the piston and the plate. The lockup device further includes a seal mechanism. The seal mechanism provides an axial seal between the inner peripheral surface of the piston and the above one of the plate and the drive member. In this lockup device, the space on one side of the piston is formed between the piston and the plate, the number of parts can be small, and the structure can be simple.

These and other objects, features, aspects and advantages of the present invention will become readily apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
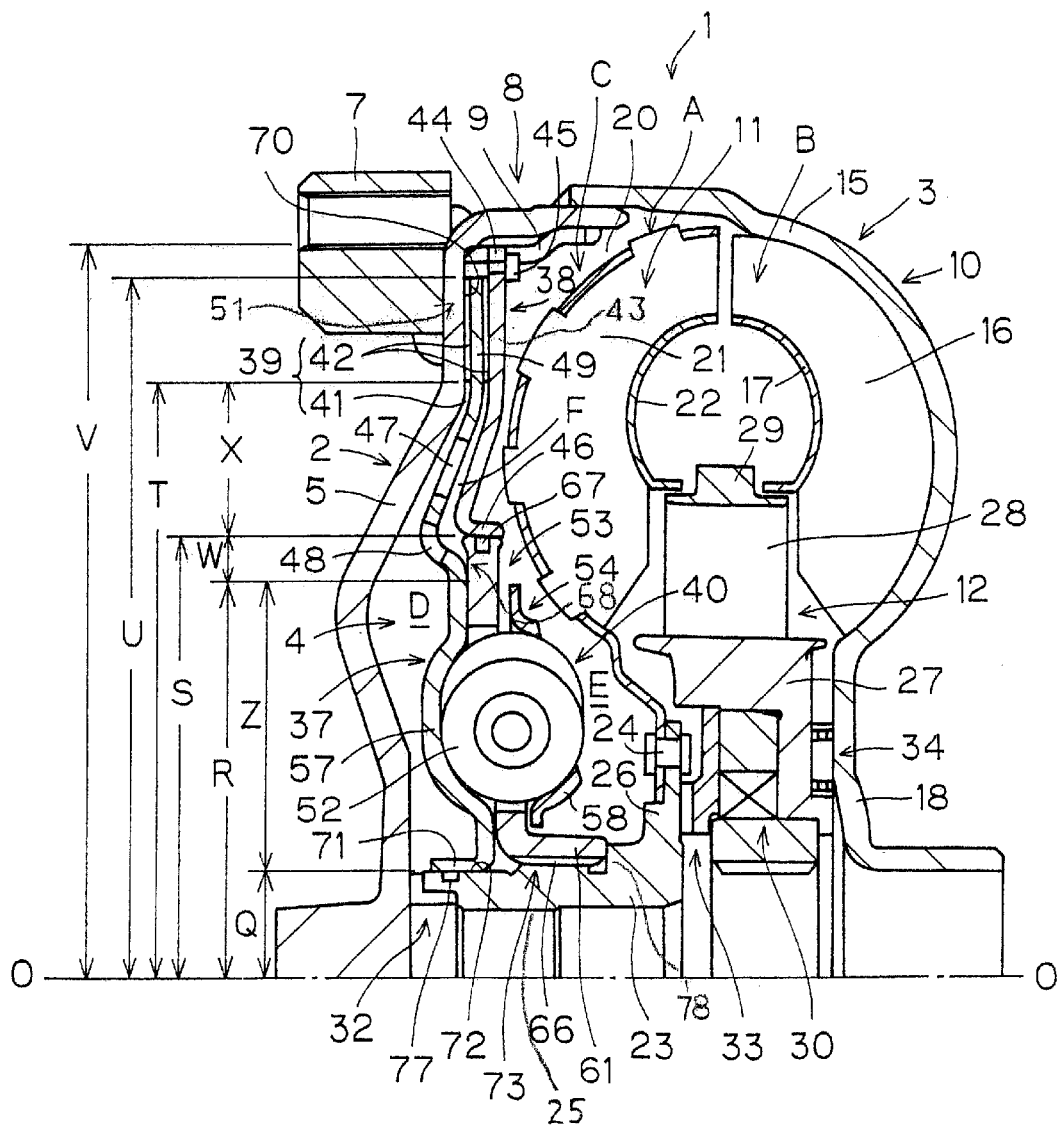
FIG. 1 is a schematic cross sectional view of an upper half of a torque converter with a lockup device having a damper mechanism in accordance with a first embodiment of the invention.

Referring initially to FIGS. 1–5, a torque converter 1 is illustrated in accordance with a first embodiment of the present invention. As seen in FIG. 1, the torque converter 1 is primarily formed of a front cover 2, a fluid operating portion 3 and a lockup device 4. The front cover 2 has a radially outer cylindrical portion 8. The fluid operating portion 3 is formed of three kinds of vane wheels (i.e., an impeller 10, a turbine 11 and a stator 12) that are coaxial with the front cover 2. The lockup device 4 is disposed in a space C. The space C is formed axially between the front cover 2 and the turbine 11. The impeller 10 has an impeller shell 15. The front cover 2 and the impeller shell 15 of the impeller 10 are fixedly coupled together at their radially outer portions so that these members form a fluid chamber A. Fluid chamber A is filled with working fluid. The impeller shell 15 has a portion further extending beyond impeller blades 16. The extending portion of the impeller shell 15 is located radially outside the turbine 11, and is integrally formed (i.e., by welding or the like) with the radially outer cylindrical portion 8 of the front cover 2.

The front cover 2 is a member that is supplied with a torque from the crankshaft (not shown) of the engine. The front cover 2 is primarily formed of a disk-like main body 5 and the radially outer cylindrical portion 8. A boss 6 is fixedly coupled to the center of the main body 5 to receive torque from the crankshaft (not shown). Several nuts 7 are fixedly coupled to a surface on the engine side of the outer peripheral portion of the main body 5. The main body 5 is provided at its outer peripheral portion with the outer cylindrical portion 8 that extends toward the transmission.

A cylindrical engagement member 9 is arranged inside surface of the outer cylindrical portion 8. The free end of the cylindrical engagement member 9 is provided with a plurality of circumferentially spaced engagement portions that extend in the axial direction toward the main body 5 of the front cover 2. The front cover 2 is further provided at its outer peripheral portion with an annular and flat friction surface 70. The flat friction surface 70 is located radially inside the main body 5. The friction surface 70 is axially directed to the transmission side of the torque converter 1, and is axially located on the transmission side of the outer peripheral portion of the main body 5.

The fluid operating portion 3 is arranged within the fluid chamber A. The fluid operating portion 3 is located on the transmission side of the fluid chamber A, in the axial direction. Thereby, the fluid chamber A is divided into a fluid operating chamber B and a space C. The fluid operating chamber B is formed of the fluid operating portion 3. The space C is formed between the main body 5 of the front cover 2 and the turbine 11.

The impeller 10 is formed of the impeller shell 15, the impeller blades 16, an impeller core 17 and an impeller hub 18. The impeller blades 16 are fixedly coupled to the inner side of the impeller shell 15. The impeller core 17 is fixedly coupled to the inner sides of the impeller blades 16. The impeller hub 18 is fixedly coupled to the inner periphery of the impeller shell 15.

The turbine 11 is disposed in the fluid chamber A and is axially opposed to the impeller 10. The turbine 11 is formed of a turbine shell 20, a plurality of turbine blades 21, a turbine core 22 and a turbine hub 23. The turbine blades 21 are fixedly coupled to the turbine shell 20. The turbine core 22 is fixedly coupled to the inner sides of the turbine blades 21. The turbine hub 23 is fixedly coupled to the inner periphery of the turbine shell 20. The turbine hub 23 is a cylindrical member and has a radial flange 26. The flange 26 of the turbine hub 23 is fixedly coupled to the inner peripheral portion of the turbine shell 20 by a plurality of rivets 24. The turbine hub 23 is further provided at its inner periphery with a spline 25. The spline 25 is engaged with an output shaft (not shown) extending from the transmission side. Thereby, a torque is transmitted from the turbine hub 23 to the transmission shaft (not shown).

The stator 12 is disposed between the inner peripheral portion of the impeller 10 and the inner peripheral portion of the turbine 11. The stator 12 is a mechanism for regulating a flow of the working fluid returning from the turbine 11 to the impeller 10. The stator 12 is formed of a stator carrier 27, a plurality of stator blades 28 and a stator core 29. The stator blades 28 are fixedly coupled to the outer peripheral surface of the stator carrier 27. The stator core 29 is fixedly coupled to the radially outer sides of the stator blades 28. The stator carrier 27 is carried on a stationary shaft (not shown) via a one-way clutch 30.

A passage 32 formed of a radial through-hole is arranged axially between the main body 5 of the front cover 2 and the turbine hub 23. A member forming the one-way clutch 30 is provided at its end surface, on the engine side in the axial direction, with a plurality of radial grooves 33. These grooves 33 allow the flow of working fluid between the radially inner and outer sides.

A thrust bearing 34 is disposed axially between the stator carrier 27 and the impeller hub 18. The stator carrier 27 is provided on its transmission side, i.e., the side axially opposed to the transmission, with a plurality of radial grooves. These grooves allow flow of the working fluid between the radially opposite sides of the thrust bearing 34.

In this embodiment, the hydraulic operation mechanism has a first oil passage, a second oil passage and a third oil passage. The first oil passage of the hydraulic operation mechanism is coupled to an axial position between the impeller hub 18 and the stator 12. The second oil passage of the hydraulic operation mechanism is coupled to an axial position between the stator 12 and the turbine hub 23. The third oil passage of the hydraulic operation mechanism is coupled to a position between the turbine hub 23 and the inner peripheral portion of the front cover 2. The first and second oil passages are usually connected to form a common hydraulic circuit for supplying the working fluid to the fluid operating portion 3, and discharging the working fluid from the fluid operating portion 3. The third oil passage is provided for supplying and discharging the working fluid to and from the space C between the front cover 2 and the turbine hub 23 from and to inside the shaft.

The space C will now be described. The space C has an annular form, and is formed axially between the main body 5 of the front cover 2 and the turbine 11. The main body 5 of the front cover 2 defines the engine side of the space C, while the transmission side of the space C is defined by the turbine shell 20 of the turbine 11. The radially outer side of the space C is primarily defined by the inner peripheral surface of the outer cylindrical portion 8, and the radially inner side of the space C is defined by the outer peripheral surface of the turbine hub 23. The radially inner side of space C, which is located between the inner peripheral portion of the front cover 2 and the turbine hub 23, is communicated with an external hydraulic operation mechanism, as already described. The space C further has a portion, which is communicated with the fluid operating chamber B via a gap formed between the outlet of the impeller 10 and the inlet of the turbine 11.

The lockup device 4 is disposed in the space C for mechanically engaging and disengaging the front cover 2 with respect to the turbine 11 in accordance with changes in hydraulic pressure in the space C. The lockup device 4 is primarily formed of a piston mechanism 37 and a second piston 38.

The piston mechanism 37 has a piston function, in which the mechanism itself operates in accordance with the hydraulic change in the space C. The piston mechanism 37 also has a damper function for absorbing and damping torsional vibrations in the rotating direction.

The piston mechanism 37 is primarily formed of a first piston 39 and a damper mechanism 40. The first piston 39 is a disk-like member, which is disposed in the vicinity of the main body 5 of the front cover 2 in the space C. The first piston 39 is made of a thin sheet metal. The first piston 39 is primarily formed of a disk-like plate 41. The first piston 39 divides the space C into a first space D near the front cover 2 and a second space E near the turbine 11.

A radially outer portion of the plate 41 forms a first frictional coupling portion 49. The first friction coupling portion 49 is disposed on the transmission side of the friction surface 70 of the front cover 2. The first frictional coupling portion 49 is an annular and flat plate-like portion that has a pair of annular friction members 42 fixedly coupled to axially opposite surfaces, respectively, of the first frictional coupling portion 49. The friction member 42 located adjacent the friction surface 70 of front cover 2 will be referred to as a first friction member, while the other friction member 42 that is fixedly coupled to the axially opposite surface of first frictional coupling portion 49 will be referred to as a second friction member.

The plate 41 is provided at its inner periphery with an inner cylindrical portion 71 extending axially toward the engine. The inner cylindrical portion 71 has an inner peripheral surface, which is supported on the outer peripheral surface 72 of the turbine hub 23 for axial and rotational movement. The outer peripheral surface 72 is provided with an annular groove, in which a seal ring 77 is disposed. The seal ring 77 is in contact with the inner peripheral surface of the inner cylindrical portion 71 for sealing the first and second spaces D and E from each other.

As already described, the inner peripheral portion of the first space D is in communication with the third oil passage, and is isolated (sealed) from the second space E by the inner periphery of the first piston 39 and the outer peripheral surface 72 of the turbine hub 23. Furthermore, the outer peripheral portion of the first space D is isolated from the second space E when the first frictional coupling portion 49 is in contact with the friction surface 70.

The damper mechanism 40 is a mechanism for transmitting a torque of the first piston 39 toward the turbine 11 and for absorbing and damping the torsional vibrations. The damper mechanism 40 is disposed in the second space E. Specifically, the damper mechanism 40 is located between the inner peripheral portion of the first piston 39 and the inner peripheral portion of the turbine shell 20. The damper mechanism 40 is primarily formed of a drive member 54, a driven member 53 (spline hub) and torsion springs 52. The inner peripheral portion of the first piston 39 serves as a portion of the damper mechanism 40, and particularly as a portion of the drive member 54. More specifically, the first piston 39 is provided with spring supports 57 forming a portion of the damper mechanism 40.

The spring supports 57 are formed in a plurality of circumferentially spaced positions, respectively. The spring supports 57 each has an axially projected form that is prepared by a drawing process to form a convexity on the engine side and a concavity on the transmission side. The spring supports 57 do not have an aperture, a recess or the like which extends axially through the whole thickness. Each spring support 57 has a circumferentially long form. The concave side of each spring support 57 has a high resistance against wearing owing to heat treatment for hardening or application of lubricant for improving lubricity. Therefore, even when the torsion spring 52 slides on the spring support 57, wearing can be suppressed.

As described above, the first piston 39 functions as a damper casing of the damper mechanism 40 so that one of drive plates in the prior art can be eliminated. As a result, the number of parts can be small, and the whole structure can be simple.

As described above, the plate 41 itself functions as the first piston 39, which moves axially. Also, the first piston 39 functions as the clutch coupling portion via the first frictional coupling portion 49. The first piston 39 further functions as the drive member in the damper mechanism 40.

Figure 2:
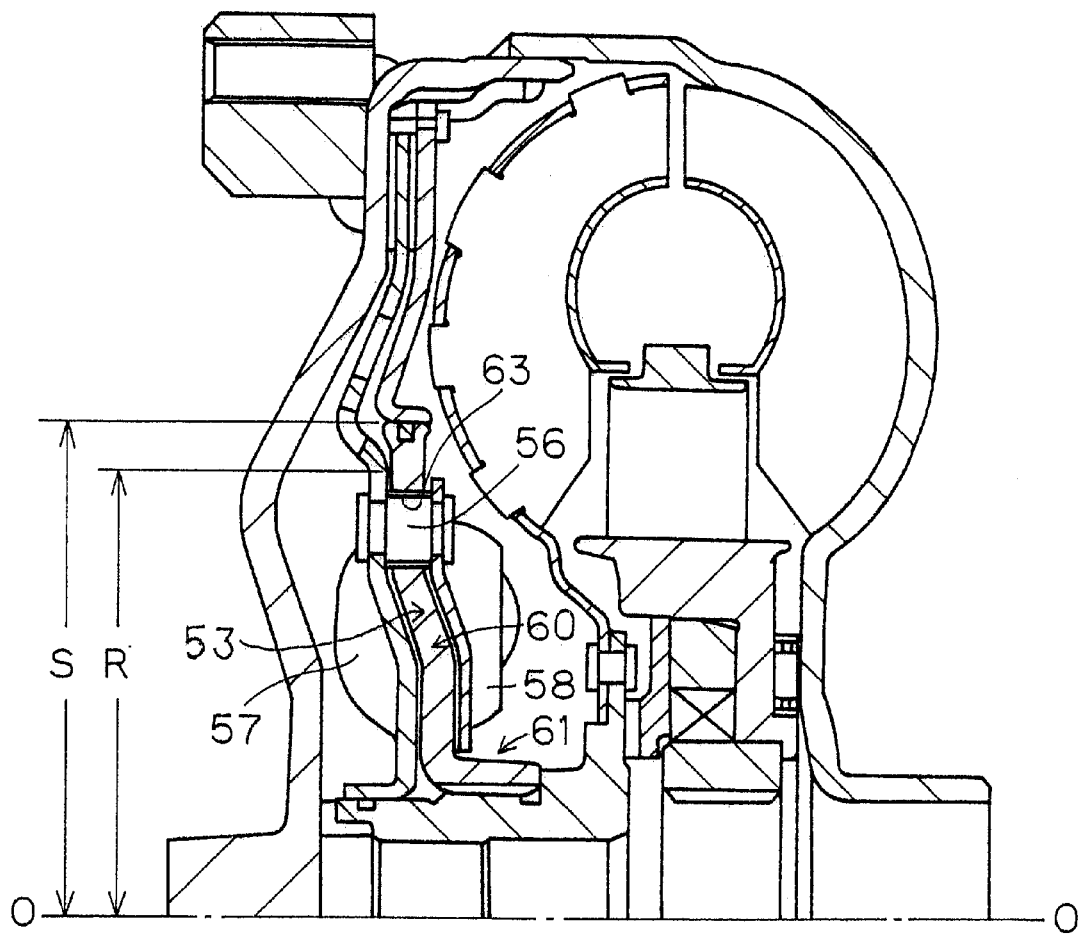
FIG. 2 is another schematic cross sectional view of an upper half of the torque converter illustrated in FIG. 1 with the lockup device rotated in accordance with the first embodiment of the invention.
Figure 3:
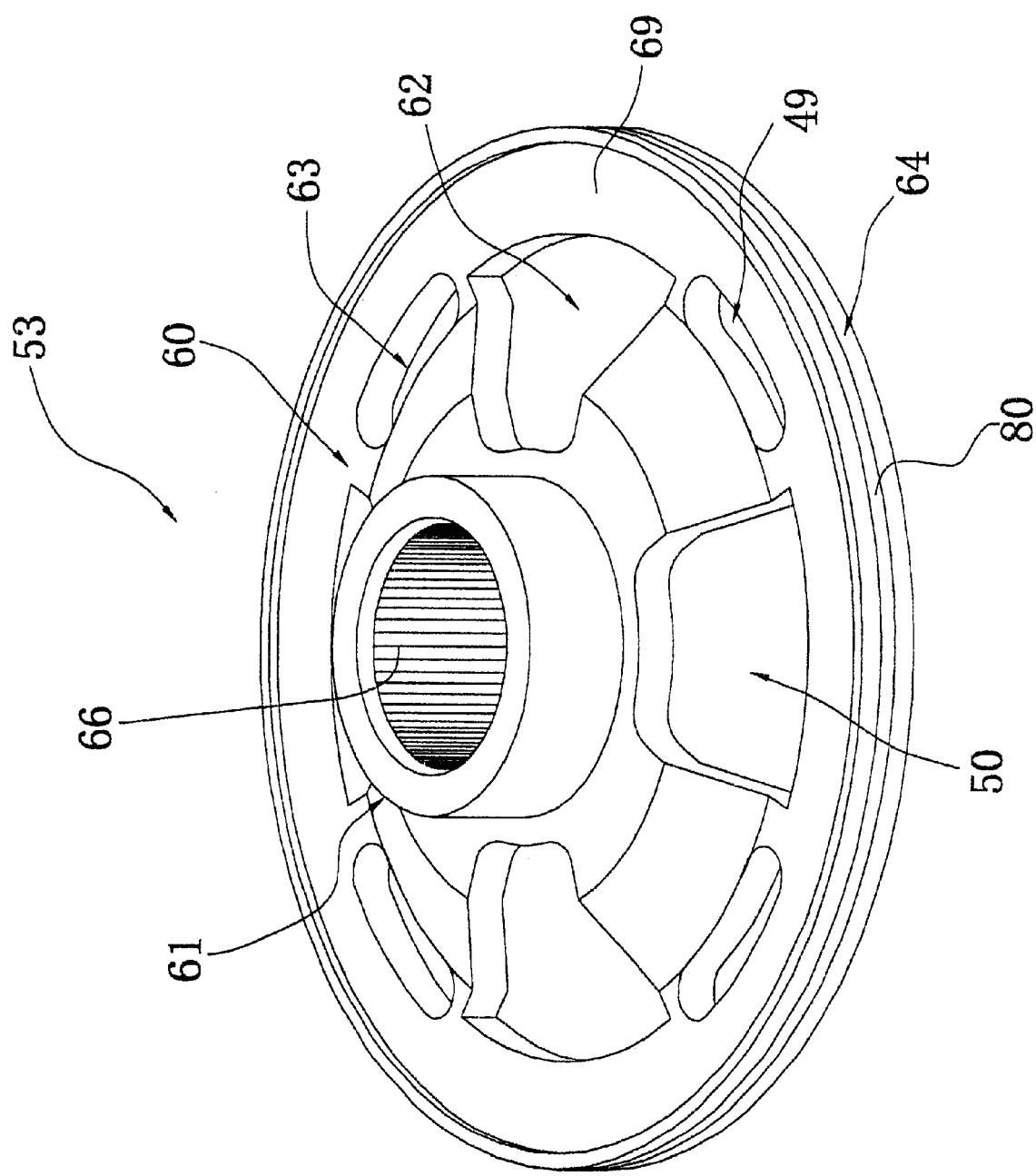
FIG. 3 is a perspective view of the driven member for the lockup device of the torque converter illustrated in FIGS. 1 and 2 in accordance with the first embodiment of the invention.

The drive member 54 is arranged on the engine side of the inner peripheral portion of the first piston 39 with an axial space therebetween. The drive member 54 is a thin disk-like plate member shaped by press working. The drive member 54 is provided with a plurality of spring supports 58 corresponding to the spring supports 57 of first piston 39, respectively. The spring supports 58 are formed of portions, which are cut and bent toward the transmission side of the torque converter. The drive member 54 has an outer peripheral portion fixedly coupled to the first piston 39 by a plurality of stud pins 56 as seen in FIG. 2. Thereby, the drive member 54 is axially positioned in a spaced relationship on the transmission side with respect to the first piston 39. Moreover, drive member 54 can rotate together with the piston 39 due to the connection via the stud pins.

The driven member 53 is a member for outputting the torque to the turbine 11. The driven member 53 will now be described in greater detail with reference to FIG. 3. The driven member 53 is a disk-like member, which is preferably made of, e.g., cast material such as steel, and has a relatively large thickness. The driven member 53 is thicker than the first piston 39 and the drive member 54. The driven member 53 is primarily formed of a boss 61 and a flange 60.

The boss 61 of the driven member 53 has a cylindrical form, and is provided at its inner periphery with spline teeth 66. The spline teeth 66 are engaged with spline teeth 73 formed on the outer peripheral surface of the turbine hub 23. Thereby, the driven member 53 is axially movable and non-rotatable with respect to the turbine hub 23. The driven member 53 is preferably centered with respect to the turbine hub 23 due to the spline engagement. The turbine hub 23 is also provided at its outer periphery with an annular stop 78 corresponding to an end surface, on the transmission side, of the boss 61. When the end surface of the boss 61 comes into contact with the annular stop 78, the driven member cannot move toward the transmission side of the torque converter.

The flange 60 of the driven member 53 is a disk-like portion extending radially outward from the boss 61. The flange 60 is arranged axially between the inner peripheral portion of the first piston 39 and the drive member 54. The flange 60 is provided with a plurality of windows 62, which are circumferentially spaced from each other. The windows 62 are formed at locations corresponding to the radial locations of the spring supports 57 and 58. The flange 60 is also provided with a plurality of recesses 63, which are circumferentially spaced from each other. Each recess 63 is positioned radially outside a portion located between neighboring windows 62. Each recess 63 has a circumferentially elongate form. In this embodiment, the windows 62 and the recesses 63 have completely closed forms, respectively. However, these may be opened radially outward as needed or desired.

Each torsion spring 52 is disposed in one of the windows 62. The torsion springs 52 are preferably coil springs extending in the rotating direction. The torsion springs 52 are supported in the rotating direction by the spring supports 57 and 58 as well as the windows 62. The spring supports 57 and 58 restrict the axial movement of the torsion springs 52. Owing to the above structures, the torsion springs 52 transmit the torque between the input members and the output member. As described above, the input members are formed of the first piston 39 and the drive member 54 and the output member is formed of the driven member 53. The torsion springs 52 are compressed in the rotating direction between the input members and output member when relative rotation occurs between the input members and the output member.

Figure 4:
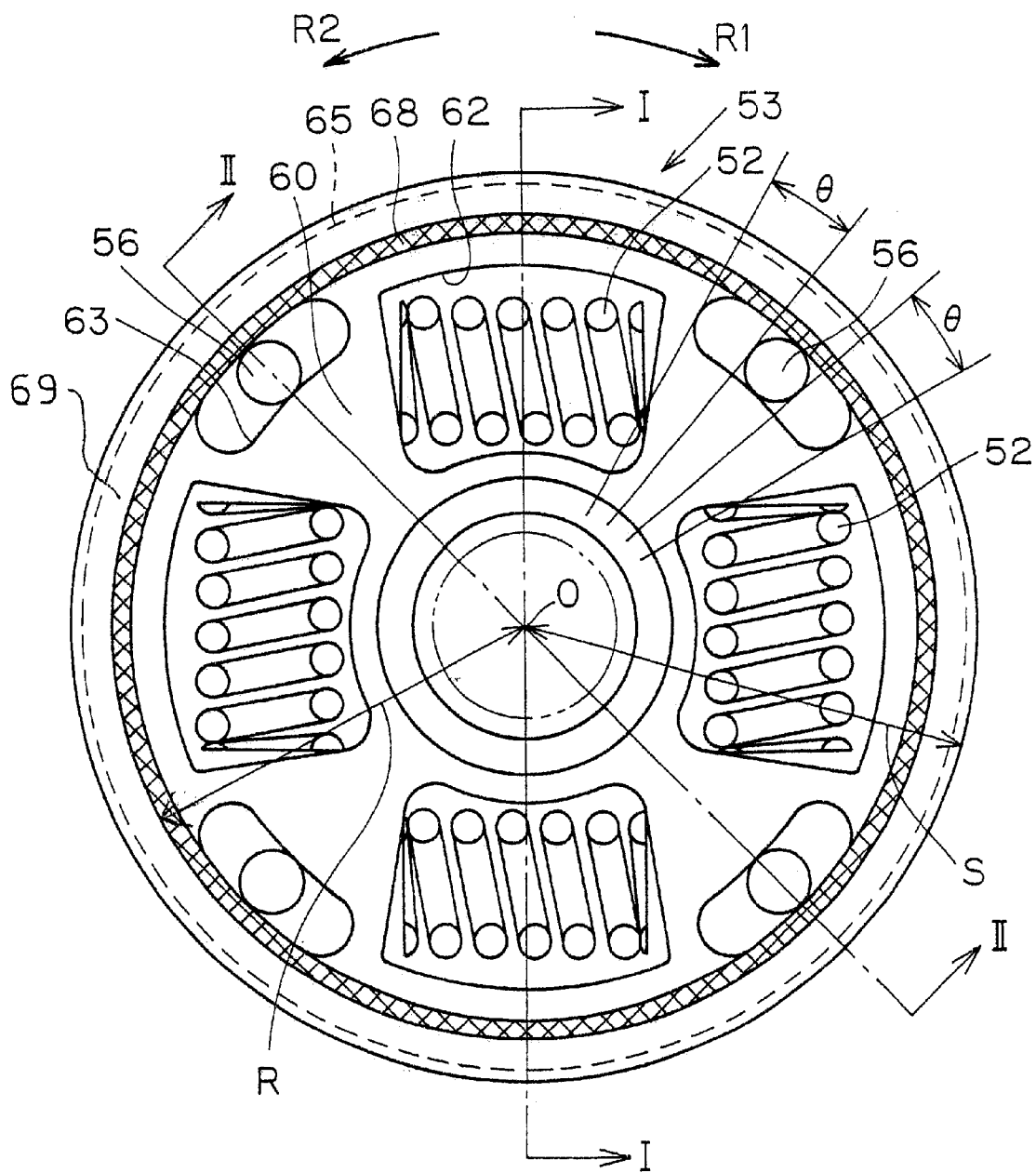
FIG. 4 is a plan of the driven member and the friction washer for the lockup device of the torque converter illustrated in FIGS. 1 and 2 in accordance with the first embodiment of the invention.

The stud pins 56 are disposed in the recesses 63. Preferably, the stud pins 56 can move circumferentially in the recesses 63. As shown in FIG. 4, a space of an angle theta is kept between the stud pins 56 and each of the circumferentially opposite end surfaces of the recesses 63 when there is no relative rotation in the damper mechanism 40. When the driven member 53 rotates relatively to the plate 41 and the drive member 54 through a relatively large torsion angle, the stud pins 56 come into circumferential contact with the end surfaces of the recesses 63. Thereby, relative rotation in the damper mechanism 40 is prevented. In other words, when the stud pins 56 contact the end surfaces of recesses 63, the drive member 54 rotates together with the plate 41, and the driven member 53 rotates together with the input members. Therefore, as described above, the stud pins 56 forms a portion of the stop of the damper mechanism 40.

Figure 5:
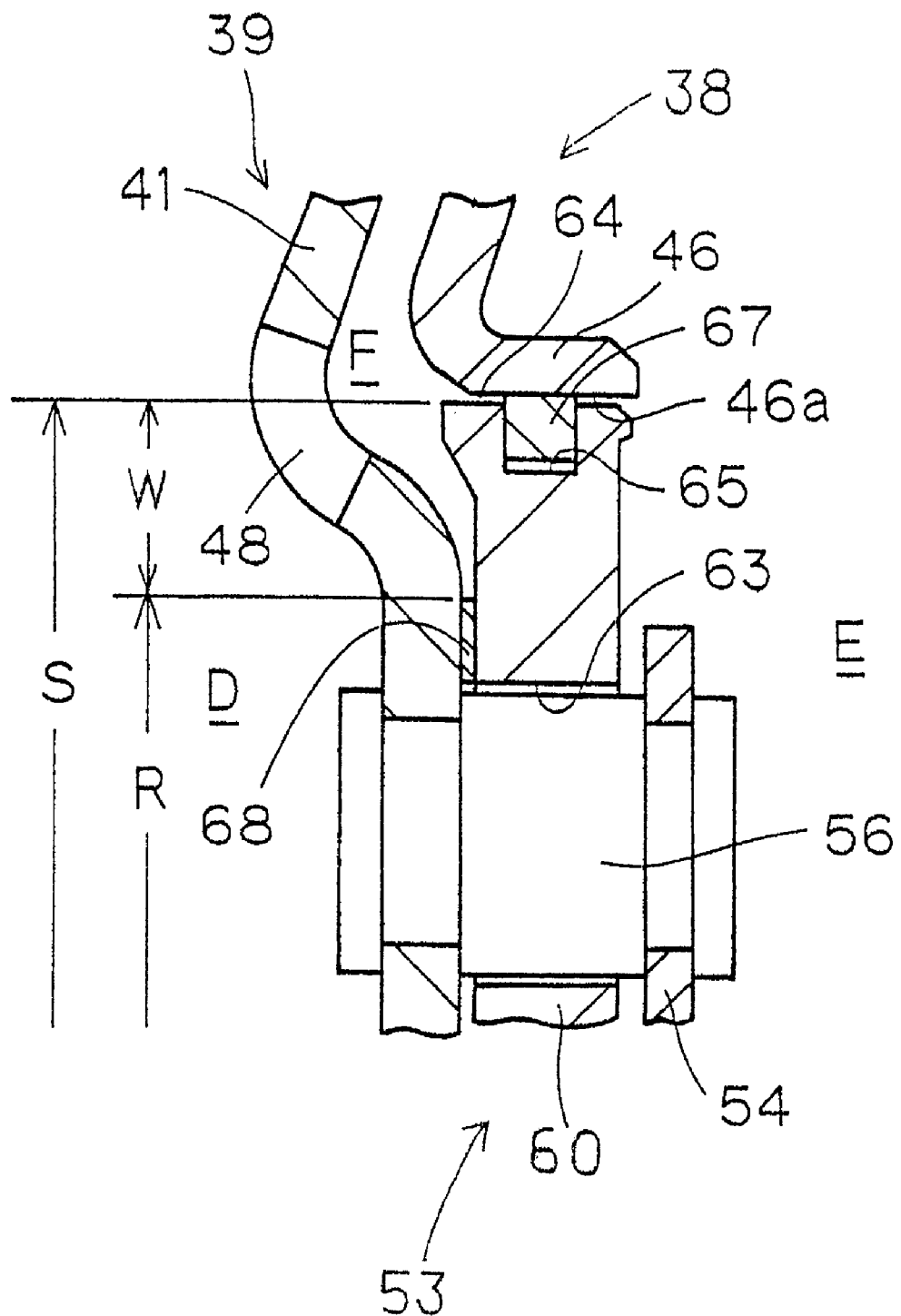
FIG. 5 is an enlarged, partial cross sectional view of a portion of the lockup device of the torque converter illustrated in FIGS. 1 and 2 in accordance with the first embodiment of the invention.

As shown in FIG. 5, the flange 60 of the driven member 53 has an outer peripheral portion 69. The outer peripheral portion 69 of the flange 60 extends radially outward beyond the outer periphery of the drive member 54. The outer peripheral portion 69 is disposed radially inside the second piston 38, and is nearly coaxial with the second piston 38. A radially inner cylindrical portion 46 of the second piston 38 is radially positioned by an outer peripheral surface 64 of the flange 60. An annular groove 65 is formed on the outer peripheral surface 64 of the flange 60. A seal ring 67 is disposed in the annular groove 65.

The seal ring 67 is in contact with an inner peripheral surface 46a of the inner cylindrical portion 46 so that seal ring 67 seals the spaces on axially opposite sides of seal ring 67 from each other. The second piston 38 and the driven member 53 rotate relatively to each other when the clutch coupling portion 51, which will be described later, is released. While the clutch coupling portion 51 is in the engaged state, the relative rotation between the second piston 38 and the driven member 53 occurs only when a torsional or twisting motion occurs in the damper mechanism 40 due to torque variations and other factors.

A friction washer 68 is fixedly coupled to the side surface of the outer peripheral portion 69 of the driven member 53. Preferably, friction washer 68 is located on the engine side of the outer peripheral portion 69. More specifically, the friction washer 68 is fixedly coupled to the radially innermost portion of the outer peripheral portion 69 that is radially outside of the recesses 63. The friction washer 68 is in axial contact with a surface of the first piston 39 on the transmission side of first piston 39. The friction washer 68 has an outer diameter R smaller than an outer diameter S of the driven member 53. The surface of the outer peripheral portion 69 on the transmission side also has a section, which is located radially outside the friction washer 68. Therefore, this radially outer section of outer peripheral portion 69 is not covered with the friction washer 68.

The second piston 38 is arranged in the second space E, and is located on the transmission side with respect to the outer peripheral portion of the first piston 39. As described above, second piston 38 is located radially outside the damper mechanism 40. The second piston 38 is an annular plate, and has a second frictional coupling portion 43 axially neighboring to the transmission side of the first frictional coupling portion 49.

The second frictional coupling portion 43 of second piston 38 has an annular and flat form, and is provided on its engine side with a pressing surface. The second piston 38 is also provided with a plurality of teeth 44 at its outer periphery. The teeth 44 are engaged with the cylindrical engagement member 9. As described above, the cylindrical engagement member 9 is arranged inside the outer cylindrical portion 8 of the front cover 2. Owing to this engagement, the second piston 38 is non-rotatable and axially movable with respect to the front cover 2.

The cylindrical engagement member 9 is provided with an annular groove. A snap ring 45 is disposed in the annular groove. An end surface of the outer peripheral portion of the second piston 38 on the transmission side is in contact with this snap ring 45. This contact with the snap ring 45 limits the axial movement of the second piston 38 toward the transmission. A gap allowing axial flow of the working fluid is formed between the engaged portions of the teeth 44 and the cylindrical engagement member 9.

The friction surface 70 of the front cover 2, the first frictional coupling portion 49 of the first piston 39 and the second frictional coupling portion 43 of the second piston 38 form the clutch coupling portion 51 of the lockup device 4.

A third space F is formed axially between the outer peripheral portion of the first piston 39 and the second piston 38. The third space F is closed by the foregoing seal ring 67 with respect to the second space E. The outer peripheral portion of the third space F is closed when the first and second frictional coupling portions 49 and 43 are in contact with each other. A gap neighbors to the inner peripheral portion of the third space F and is located between the first piston 39 and the driven member 53. The friction washer 68 seals the gap.

A portion of the plate 41 corresponding to the inner peripheral portion of the second piston 38 is provided with a plurality of axial through-apertures 47. Preferably, through-apertures 47 are circumferentially spaced from each other. Furthermore, a plurality of axial through-apertures 48 are circumferentially spaced from each other and are formed in a portion of the plate 41 corresponding to the location of the outer periphery of the driven member 53. The first and third spaces D and F are in communication with each other through these apertures 47 and 48.

In this embodiment, the first and second frictional coupling portions 49 and 43 themselves form the pistons, which actually move in the axial direction. Therefore, the pressing force acts from the first piston 39 to the friction surface 70 via the first frictional coupling portion 49, and the pressing force acts from the second piston 38 to the first frictional coupling portion 49 via the second frictional coupling portion 43.

In this clutch coupling portion 51, the inner diameter (S) of the second. piston 38 is larger than the inner diameter (Q) of the first piston 39. Therefore, the pressing force applied to the first frictional coupling portion 49 from the second piston 38 is smaller than that in the case where the inner diameter of the second piston 38 is equal to the inner diameter of the first piston 39. Accordingly, the small pressing force can be generated as compared with the case where the friction surface is merely doubled. Therefore, the wearing and breakage of the friction members 42 and other parts can be suppressed. By changing the size of the second piston 38, the pressing force acting on the clutch coupling portion 51 can be easily changed. In other words, simply changing the size of the second piston 38 can vary the pressing force rather than changing other characteristics of the lockup device. From a different viewpoint, it can be considered that the second piston 38 also has the inner diameter (S) larger than an inner diameter of the piston mechanism 37.

As discussed above, the second piston 38 serves as an input member rotating together with the front cover 2. Second piston 38 is disposed radially outside the damper mechanism 40. Therefore, a space on one side of damper mechanism 40 in the axial direction is not restricted. Accordingly, the axial size of the torsion springs 52 (i.e., the diameter of each torsion spring) in the damper mechanism 40 can be increased. This facilitates the design, and a high performance. Characteristics such as a low rigidity of the torsion spring 52 can be achieved and easily varied without the need to change other characteristics of the lockup device.

Radial sizes of the respective members of the lockup device 4 will now be described. It is now assumed that the piston mechanism 37, first piston 39 and plate 41 have an inner diameter of Q. The friction washer 68 has an outer diameter of R. The outer diameter of the driven member 53 and the inner diameter of the second piston 38 are equal to S. The friction members 42 have an inner diameter of T and an outer diameter of the friction members 42 is equal to U. The second piston 38 has an outer diameter of V. There is a relationship of Q<R<S<T<U<V. The pressure receiving portion of the first piston 39 or plate 41 is formed of an annular portion which is defined between the radii R and Q, and has a radial length of Z. The pressure receiving portion of the second piston 38 is formed of an annular portion which is defined between the radii T and S, and has a radial length of X.

Similarly to the first piston 39, the driven member 53 can function as a piston which is axially movable in accordance with changes in hydraulic pressure in the space C. The pressure receiving portion of the driven member 53 is an annular portion which has a radial length of W and is defined between the radii S and R. The driven member 53 can apply an axial load to the first piston 39 via the friction washer 68. This function of the driven member 53 is achieved by the following three structures. First, the driven member 53 is axially movable with respect to the turbine hub 23 and the first piston 39. Second, the first space D functioning as a hydraulic operation chamber of the first piston 39 is opened toward the driven plate 53 via the apertures 48 of the first piston 39. Third, a portion of first space D (opened toward the driven member 53) is sealed by the friction washer 68 with respect to the second space E.

Operation of the lockup device will now be described. In the clutch disengaged state, the working fluid is supplied from the third oil passage to the radially inner portion of the first space D. The working fluid in the first space D flows radially outward through the space between the friction surface 70 and the first frictional coupling portion 49. The working fluid further flows through a gap between the cylindrical engagement member 9 and the teeth 44 to the radially outer portion of the second space E. The working fluid in the second space E flows through a space between the impeller shell 15 and the turbine shell 20, and flows into the fluid operation chamber B through a gap between the outlet of the impeller 10 and the inlet of the turbine 11. The working fluid moving in the first space D also flows into the third space F through the apertures 47 and 48 formed in the first piston 39. The working fluid in the third space F flows radially outward through the space between the first and second frictional coupling portions 49 and 43. This working fluid likewise flows through the gap between the cylindrical engagement member 9 and the teeth 44 toward the radially outer portion of the second space E.

In this operation, the first and second pistons 39 and 38 themselves function as the pistons and are axially movable. The first and second pistons 39 and 38 move axially in accordance with changes in hydraulic pressure in the space C due to the flow of working fluid. The axial movement of the first and second pistons 39 and 38 are stable. Accordingly, mutual contact between the members in the clutch coupling portion 51 can be suppressed in the clutch releasing operation. More specifically, the snap ring 45 restricts the axial movement of the second piston 38 toward the transmission, and the turbine hub 23 restricts the axial movement of the piston mechanism 37. As a result, predetermined clearances are reliably kept between the friction surface 70 and the first frictional coupling portion 49 and between the first and second frictional coupling portions 49 and 43, respectively.

The clutch engaging operation of the lockup device will now be described. The working fluid in the first space D is drained via the third oil passage. Thereby, the working fluid in the first space D flows radially inward, and the working fluid in the third space F flows into the first space D via the apertures 47 and 48. As a result, the first piston 39 moves axially toward the engine, and the first frictional coupling portion 49 comes into contact with the friction surface 70 of the front cover 2. Furthermore, the second piston 38 also moves axially toward the engine, and the second frictional coupling portion 43 comes into contact with the first frictional coupling portion 49 during this operation.

The drive member 53 axially moves toward the engine in accordance with the pressure difference between the axially opposite sides thereof. Therefore, the friction washer 68 is pressed against the first piston 39. The pressing force applied from the driven member 53 toward the first piston 39 acts on the friction surface 70 of the front cover 2 via the first frictional coupling portion 49 of first piston 39.

The following operation is performed when torsional vibrations occur in the lockup device 4. Torsional vibrations occur when the lockup device is in the clutch engaged state. More specifically, it is now assumed that torque vibrations are transmitted to the torque converter 1 from the engine via the front cover. In this case, the relative rotation occurs in the damper mechanism 40. More specifically, relative rotation occurs between the input members and the output member. The input members are formed of the first piston 39 and the drive member 54, and the output member is formed of the driven member 53, as discussed above. As a result, the torsion springs 52 are compressed in the rotating direction. In this operation, the friction washer 68 that is arranged on the driven member 53 slides on the first plate 41 so that a hysteresis torque occurs. In the damper mechanism 40 described above, the torsional vibrations are damped due to the compression of the torsion springs 52 and the presence of hysteresis torque caused by the friction washer 68.

In the foregoing vibration damping operation, the axial force is produced by the hydraulic pressure is applied to the driven member 53, and the axial force is applied to the friction-generating portion. The friction generating portion is formed between the friction washer 68 and the first piston 39. Therefore, a disk spring, a wavy spring or the like is not required so that the number of parts as well as the required space for parts can be reduced.

In the damper mechanism 40 described above, the compression of the torsion springs 52 and the hysteresis torque of the friction washer 68 serve to damp the torsional vibrations. The friction washer 68 provides the friction generating portion for generating the friction and therefore hysteresis torque between the first piston 39 and the driven member 53. In this friction generating portion, since the pressing force against the friction surface is produced from the hydraulic pressing or pushing load, an additional member such as a spring is not required. The friction washer 68 may be fixedly arranged on the side of the first piston 39, or a friction washer may be fixedly coupled to both of the opposing surfaces. This friction generating portion may be achieved by the friction washer or another structure other than the washer as needed or desired.

The friction washer 68 also functions as a seal member, as discussed above. The friction washer 68 is pressed axially strongly against the first piston 39 from the transmission side. This strong contact seals the gap between the outer peripheral portion 69 of the driven member 53 and the first piston 39. This strong contact also prevents the communication between the inner peripheral portion (i.e., the portion opened axially toward the transmission side via the apertures 48 and outer apertures 47) of the third space F and the second space E.

One main advantage achieved by supporting the inner peripheral portion of the second piston 38 by the driven member 53 is that a simplified structure can be attained. More specifically, the second piston 38 is radially is supported by the driven member 53, which is a part of the damper mechanism 40. Therefore, it is not necessary to employ a special member and/or a special structure for supporting the second piston 38 so that the whole structure of the lockup device 4 can be simple.

In particular, the driven member 53 can have an increased axial thickness compared with the other plate members. This allows easy formation of the annular groove in the driven member 53. The increased thickness of the driven member 53 is allowed because it is not necessary to form a drawn portion and/or a cut and bent portions. Such a structure contrasts to such portions as spring supports 57 and 58 of the plate 41 and the drive member 54, respectively.

Since the drive member 54 and the plate 41 have relatively small thicknesses, an annular groove for disposing a seal therein cannot be easily formed on the outer peripheral surfaces of these plate members for supporting the second piston 38 by these plate members. Therefore, it would be necessary to form the cylindrical outer peripheral surface by drawing of one of the plate members, and further it would be necessary to form a groove on the outer peripheral surface. These complicated steps increase a manufacturing cost.

Another main advantage achieved by supporting the inner peripheral portion of the second piston 38 by the driven member 53 is the achievement of the stop mechanism of the damper mechanism 40 by the stud pins 56. According to this lockup device 4, the stud pins 56 fixing the drive member 54 and the first piston 39 together function as a rotational stop of the damper mechanism 40. This structure is allowed by the structure in which the driven member 53 supports the second piston 38. In contrast to this preferred embodiment of the present invention, it is possible that the first piston 39 and/or the drive member 54 may support the second piston 38 if desired. In such a case, a fixing member(s) for fixing the first piston 39 and the drive member 54 together is located radially outside the inner peripheral surface of the second piston 38. Since the space for this fixing member(s) is axially restricted by the front cover and the turbine, the fixing member(s) cannot be increased in size to an extent allowing use of the fixing member(s) as a rotational stop.

The structure of the hydraulic chamber for operating the first piston 39 and the driven member 53 will now be discussed. The first piston 39 seals the radially inner and outer portions of the first space D by itself so that it can move axially in accordance with the changes in hydraulic pressure in the first space D. Furthermore, the first piston 39 has portions (e.g., apertures 47 and 48) which extend axially therethrough, and thereby the first space D is axially expanded toward the transmission side of the first piston 39 itself.

In this arrangement of the hydraulic chamber, the other members themselves (e.g., the second piston 38 and the driven member 53) can have a function as pistons, which can move in the axial direction. The members (e.g., the second piston 38 and the driven member 53) having the function as the pistons other than the first piston 39 must seal the transmission side, in the axial direction, of the apertures (e.g., apertures 47 and 48) formed in the first piston 39. In order create such a seal, there are arranged the seal ring 67, the friction washer 68 and the friction member 42 neighboring to the second frictional coupling portion 39 as seal members for such a purpose. In this manner, the apertures 47 and 48 as well as the third space F form a portion of the first space D, and the first space D is isolated sealed) from the second space E.

In particular, this embodiment is provided with two members (the second piston 38 and the driven member 53) that have the piston function other than the first piston 39. These two members (the second piston 38 and the driven member 53) radially support each other via the supporting portion, in which the seal mechanism (the seal ring 67) is disposed. Between the two members having the piston function other than the first piston 39, the second piston 38 is configured to apply the pressing force to the clutch coupling portion 51 independently of the first piston 39. The driven member 53 is configured to apply the pressing force to the clutch coupling portion 51 via the first piston 39.

According to the lockup device of the torque converter of the present invention, since the inner peripheral surface of the piston is supported by the outer peripheral surface of the driven member, the structure for arranging the seal mechanism can be simple.

According to the lockup device of the torque converter of the invention, since the second piston rotates together with the front cover, it is possible to provide the two friction surfaces in the lockup device. Furthermore, the second piston has the inner diameter larger than the outer diameter of the damper mechanism, and the piston is arranged radially outside the damper mechanism. Therefore, the axial size of the torsion springs in the damper mechanism can be increased. Therefore, the design work can be easy, and the improvement of the function such as a low rigidity of the torsion springs can be achieved.

Second Embodiment

Figure 6:
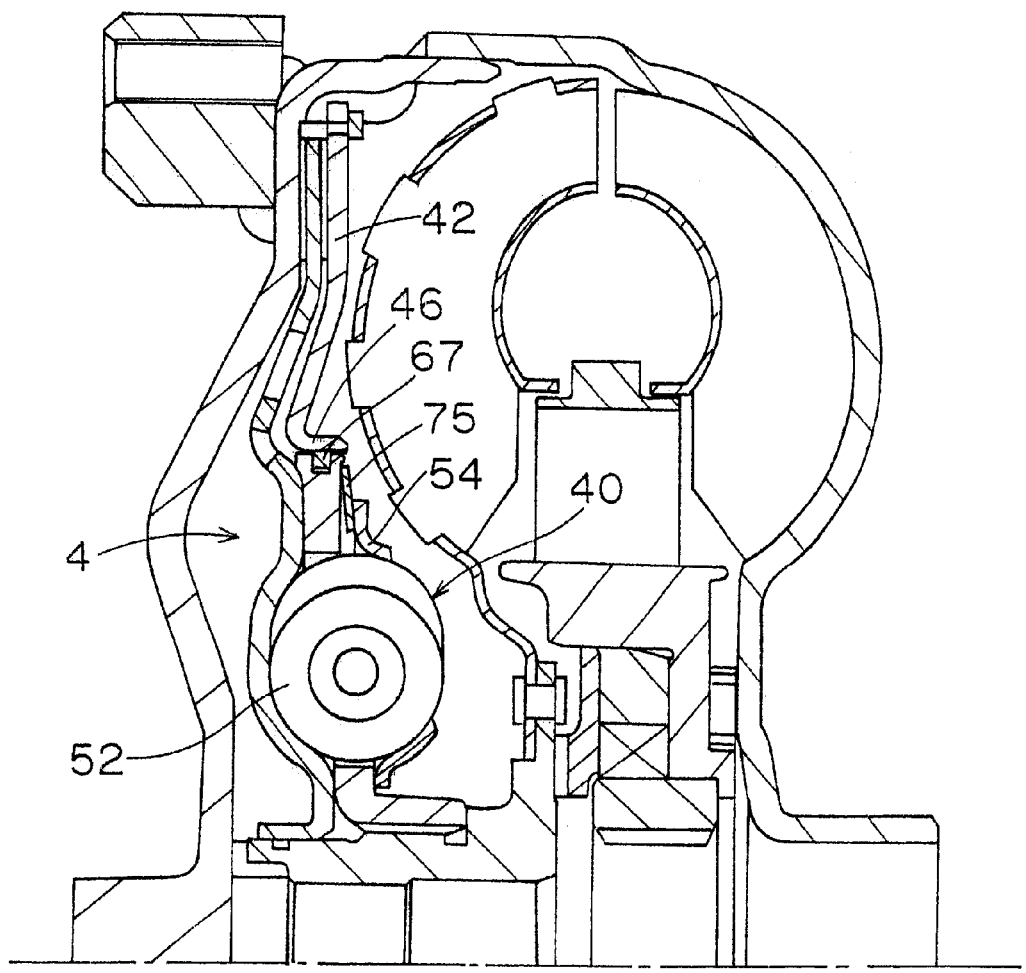
FIG. 6 is a schematic, partial cross sectional view of an upper half of a torque converter with a lockup device having a damper mechanism in accordance with a second embodiment of the present invention.
Figure 7:
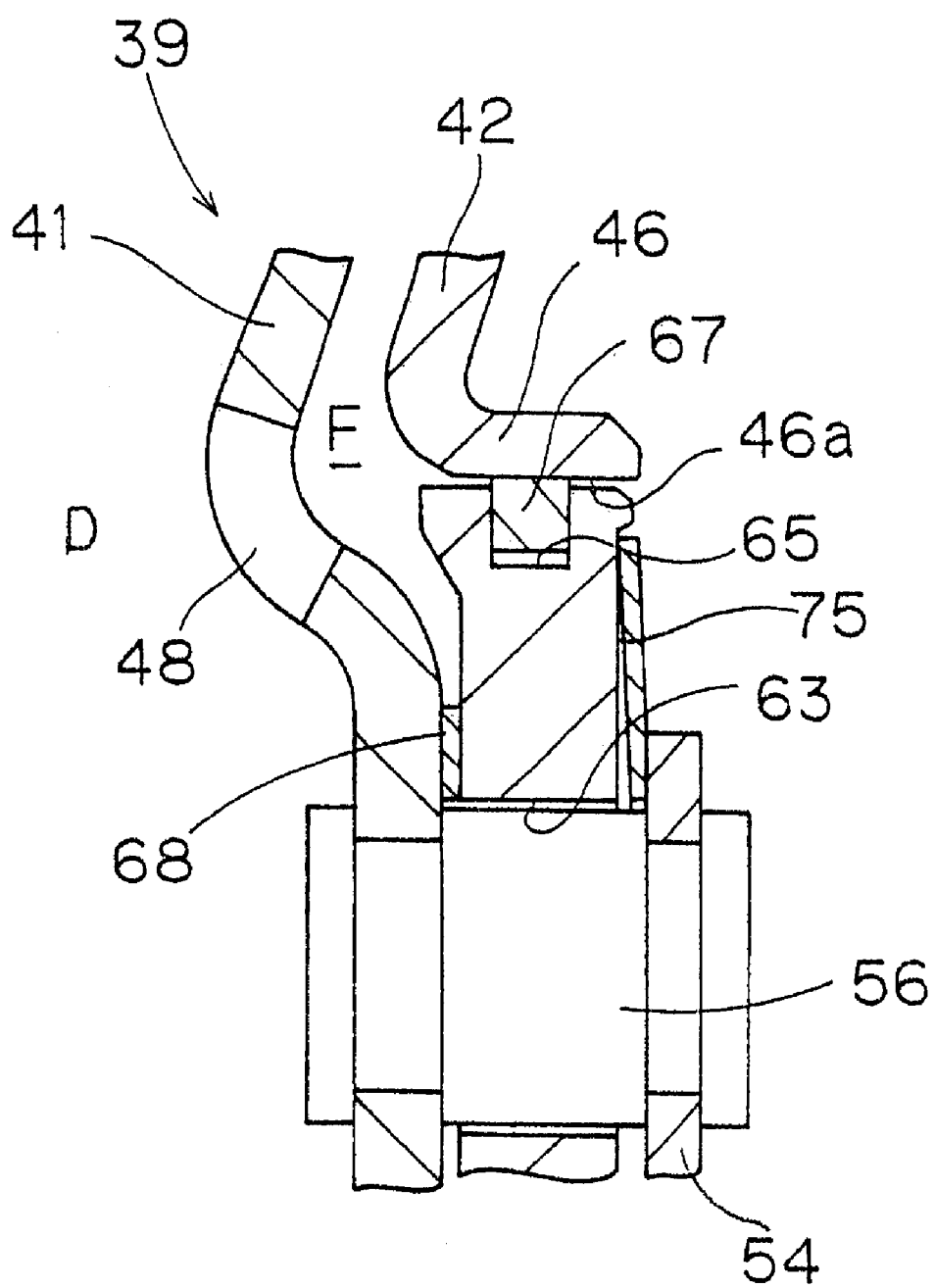
FIG. 7 is an enlarged, partial cross sectional view of a portion of the lockup device of the torque converter illustrated in FIG. 6 in accordance with the second embodiment of the invention.

Referring now to FIGS. 6 and 7, a torque converter 1 is illustrated in accordance with a second embodiment of the present invention. The second embodiment is substantially the same as the first embodiment, except for portions that have been modified as explained below. Since this embodiment is substantially the same as the first embodiment, this embodiment will not be discussed or illustrated in detail herein. Moreover, since this embodiment is substantially the same as the first embodiment, identical or substantially identical parts will be identified with the same reference numerals as the first embodiment.

Specifically, the first embodiment has been modified such that a conical spring 75 is disposed between the outer peripheral portion 69 of the driven member 53 and the outer peripheral portion of the drive member 54 in this embodiment. In this embodiment, the inner periphery of the second piston 38 is likewise supported by the outer periphery of the drive member 54.

The conical spring 75 is disposed between the outer peripheral portion 69 of the driven member 53 and the outer peripheral portion of the drive member 54. The conical spring 75 is compressed in the axial direction, and applies biasing forces in the axially opposite directions to the drive member 54 and the driven member 53, respectively. As a result, the friction washer 68 is pressed against the first piston 39. In this embodiment, the conical spring 75 can generate a stable hysteresis torque on the friction washer 68.

According to the lockup device of the torque converter of the invention, since the inner peripheral surface of the piston is supported by the outer peripheral surface of the driven member, the structure for arranging the seal mechanism can be simple.

Third Embodiment

Figure 8:
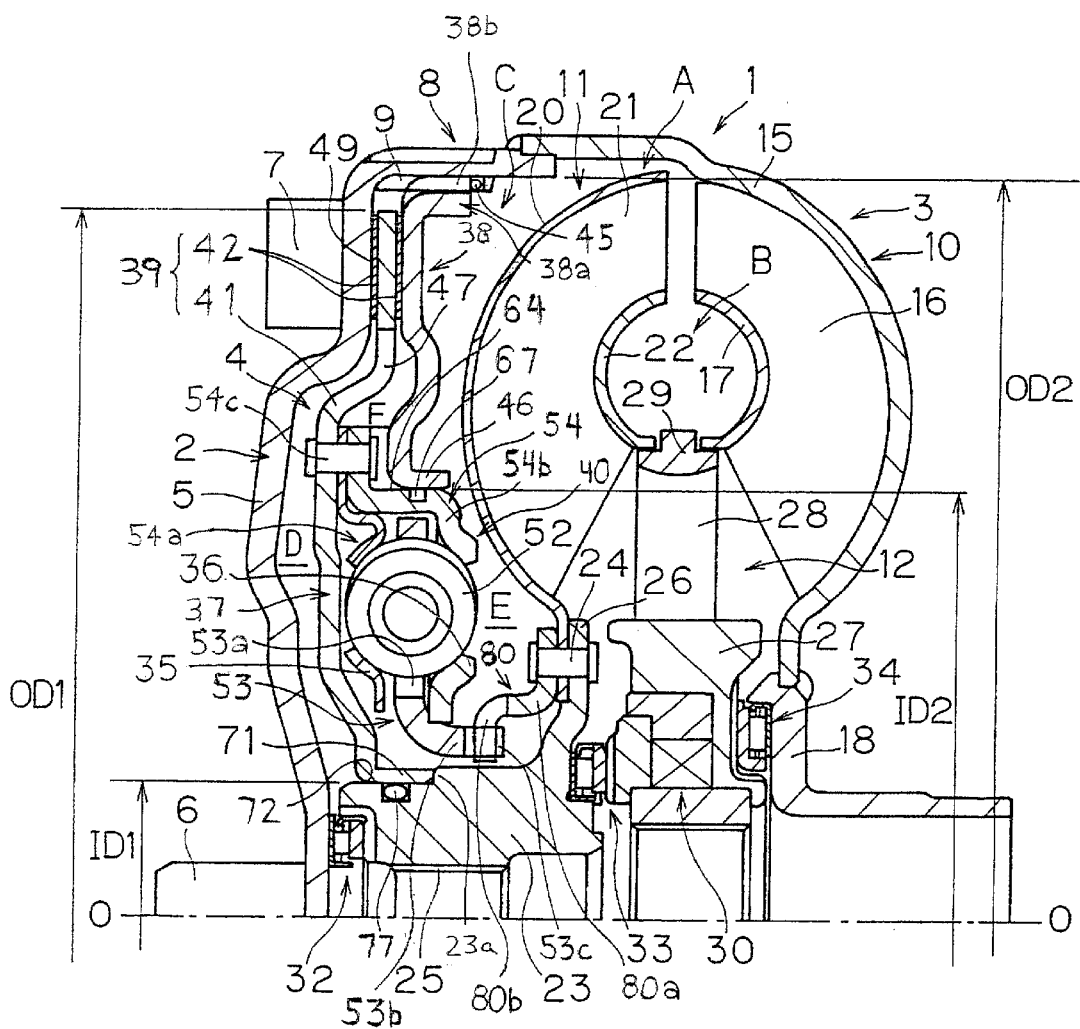
FIG. 8 is a schematic cross sectional view of an upper half of a torque converter with a lockup device having a damper mechanism in accordance with a third embodiment of the invention.
Figure 9:
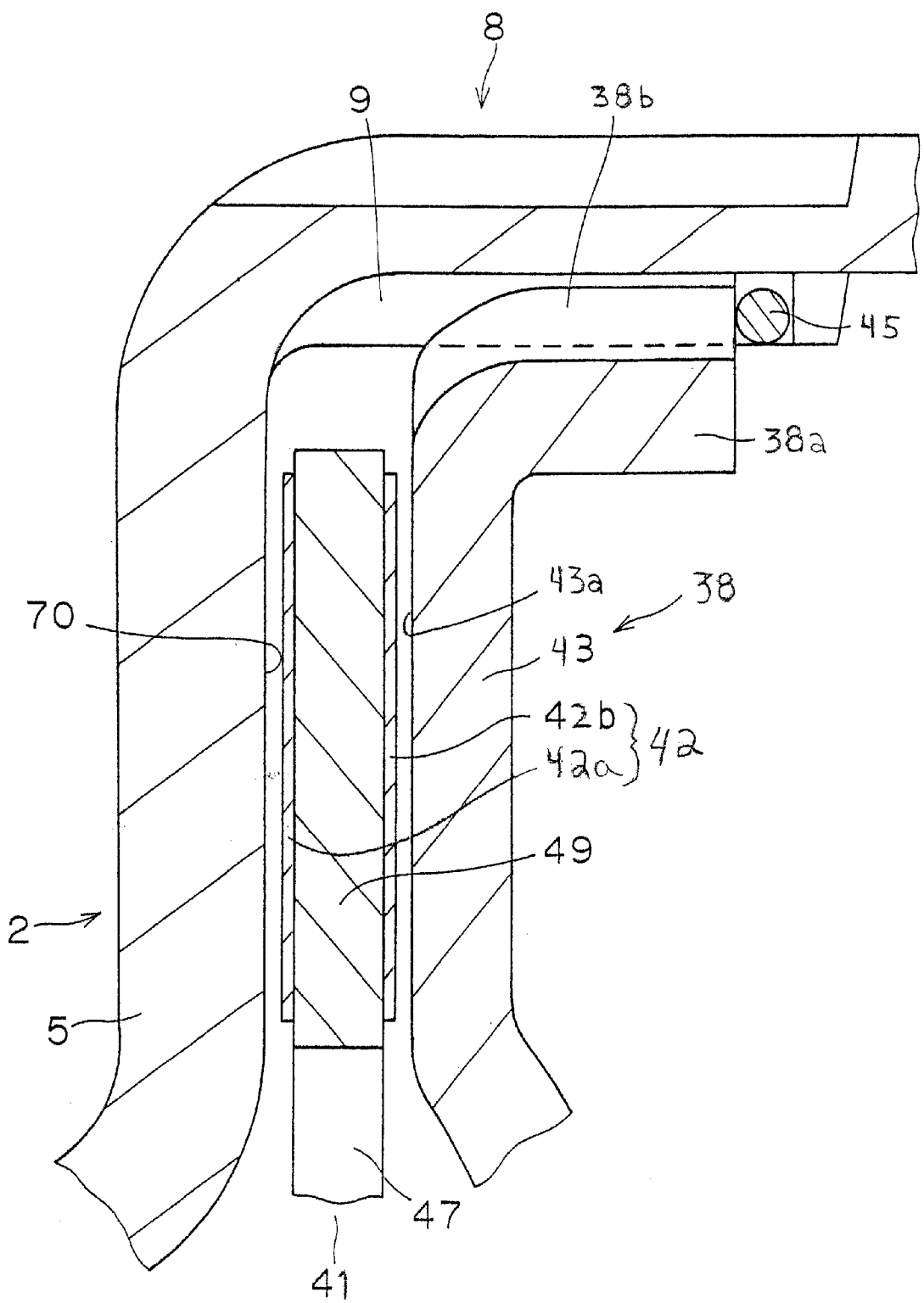
FIG. 9 is an enlarged, partial cross sectional view of a clutch coupling portion of the lockup device illustrated in FIG. 8 in accordance with the third embodiment of the invention.
Figure 10:
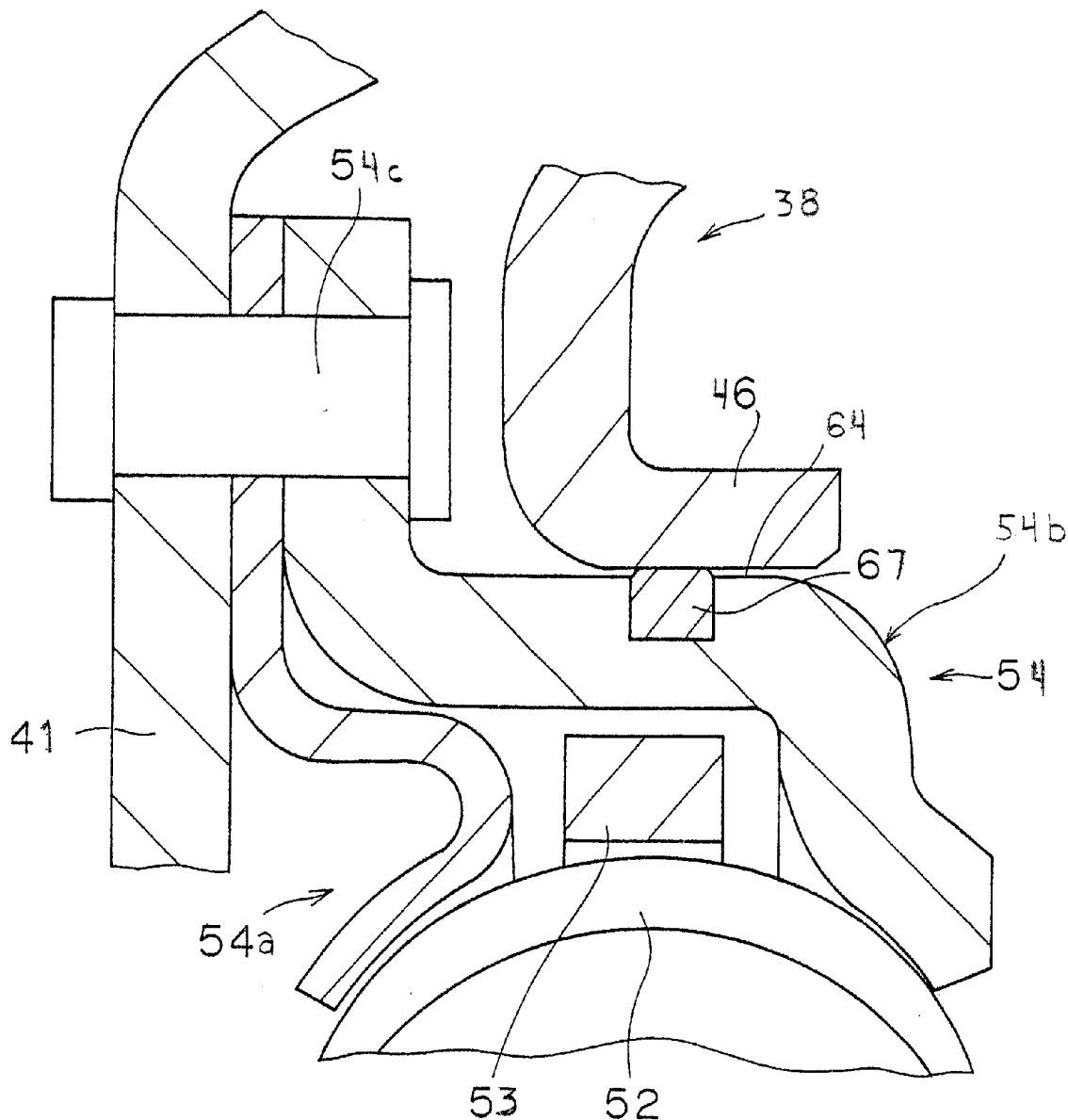
FIG. 10 is an enlarged, partial cross sectional view of a piston supported by the damper mechanism of the lockup device illustrated in FIG. 8 in accordance with the third embodiment of the invention.

Referring now to FIGS. 8–10, a modified torque converter 1 with a modified lockup device 4 is illustrated in accordance with a third embodiment of the present invention. The third embodiment is substantially the same as the first embodiment, except for portions that have been modified as explained below. Since this embodiment is substantially the same as the first embodiment, identical or substantially identical parts will be identified with the same reference numerals as the first embodiment.

Specifically, the first embodiment has been modified such that a pair of drive plates 54a and 54b form the drive member 54, and the drive plate 54b radially supports the second piston 38 in this embodiment. Additionally, drive plate 54b radially supports the driven member 53. Furthermore, driven member 53 is non-rotatable and axially movable with respect to the turbine via a pair of claw portions so that the turbine hub is not splined.

The lockup device of a torque converter in accordance with the third embodiment of the present invention will now be described in more detail.

The main body 5 is provided at its outer peripheral portion with the outer cylindrical portion 8 that extends toward the transmission. The outer cylindrical portion 8 is provided along its entire circumference with radial convexities and concavities. The radial convexities and concavities are located in an alternating arrangement to each other. These convexities and concavities provide lugs or splines 9 on the inner radial side of the outer cylindrical portion 8. The front cover 2 is further provided at its outer peripheral portion with an annular and flat friction surface 70 as seen in FIG. 2. The friction surface 70 is located radially inside the outer cylindrical portion 8 of the front cover 2. The friction surface 70 is axially directed to the transmission side of the torque converter 1, and is axially located on the transmission side of the outer peripheral portion of the main body 5.

A first thrust bearing 32 is disposed axially between an inner peripheral portion of the main body 5 of the front cover 2 and the turbine hub 23. The turbine hub 23 is provided at its end surface with a plurality of radial grooves. The end surface of the turbine hub 23 is located on the engine side of the turbine hub 23 in the axial direction. The radial grooves in the turbine hub 23 allow flow of the working fluid between radially opposite sides of the first thrust bearing 32.

A second thrust bearing 33 is disposed axially between the turbine hub 23 and the one-way clutch 30. A member is provided on the engine side of the one way sub-clutch 30, i.e., the side axially opposed to the engine, and forms a part of the one-way clutch 30. This member is provided with a plurality of radial grooves. These grooves allow flow of the working fluid between the radially opposite sides of the second thrust bearing 33.

A third thrust bearing 34 is disposed axially between the stator carrier 37 and the impeller hub 18. The stator carrier 27 is provided with a plurality of radial grooves on the transmission side of the stator carrier 27, i.e., the side axially opposed to the transmission. These grooves allow flow of the working fluid between the radially opposite sides of the third thrust bearing 34.

The lockup device 4 is disposed in the space C for mechanically, rotationally engaging and disengaging the front cover 2 with respect to the turbine 11 in accordance with changes in hydraulic pressure in the space C. The lockup device 4 is primarily formed of a piston mechanism and a piston 38.

The piston mechanism 37 has a piston function, in which the mechanism itself operates in accordance with changes in hydraulic pressure in the space C. The piston mechanism 37 also has a damper function for absorbing and damping torsional vibrations in the rotating direction.

The piston mechanism 37 is formed of a first piston 39 and a damper mechanism 40. The first piston 39 is a disk-like member, which is disposed in an axially adjacent position relative to the main body 5 of the front cover 2. In other words, the piston 39 is located in the space C. The first piston 39 is primarily formed of a disk-like plate 41. The disk-like plate 41 of the piston 39 divides the space C into a first space D adjacent the front cover 2 and a second space E adjacent the turbine 11.

A radially outer portion of the plate 41 forms a first frictional coupling portion 49. The first frictional coupling portion 49 is disposed on the transmission side of the friction surface 70 of the front cover 2. The first frictional coupling portion 49 is an annular, flat plate-like portion that has a pair of friction members 42. Friction members 42 are fixedly coupled to axially opposite surfaces of first frictional coupling portion 49. The friction member 42 axially opposed to the friction surface 70 of front cover 2 will be referred to as a first friction member 42a. The other friction member 42 fixedly coupled to the axially opposite surface of first frictional coupling portion 49 will be referred to as a second friction member 42b.

The disk-like plate 41 is provided at its inner periphery with an inner cylindrical portion 71. The inner cylindrical portion 71 extends axially from the inner periphery of the disk4ike plate 41 toward the transmission. The inner cylindrical portion 71 has an inner peripheral surface, which is supported on an outer peripheral surface 72 of the turbine hub 23 to allow axial and rotational movement of the inner cylindrical portion 71 relative to turbine hub 23.

The turbine hub 23 is provided at its outer peripheral surface 72 with an annular contact portion 23a. Annular contact portion 23a of turbine hub 23 is located on the transmission side of the inner cylindrical portion 71 in an axial direction. This structure restricts the axial movement of the plate 45 toward the transmission when inner cylindrical portion 71 engages annular contact portion 23a. The outer peripheral surface 72 is provided with an annular groove. A seal ring 77 is disposed in the annular groove of outer peripheral surface 72. The seal ring 77 contacts the inner peripheral surface of the inner cylindrical portion 71. This seal ring 77 seals the first and second spaces D and E from each other.

As already described, the inner peripheral portion of the first space D is in communication with the third oil passage. The inner peripheral portion of the first space D is also isolated (sealed) from the second space E by the inner periphery of the first piston 39 and the outer peripheral surface 72 of the turbine hub 23. Furthermore, the outer peripheral portion of the first space D is isolated (sealed) from the second space E when the first friction member 42a of first frictional coupling portion 49 is in contact with the friction surface 70 of front cover 2. The outer peripheral portion of the first space D is communicated with the second space E when the first friction member 42a of first frictional coupling portion 49 is spaced from the friction surface 70 of front cover 2.

The damper mechanism 40 is a mechanism for transmitting a torque of the first piston 39 toward the turbine 11 and for absorbing and damping the torsional vibrations. The damper mechanism 40 is located axially between the inner peripheral portion of the first piston 39 and the inner peripheral portion of the turbine shell 20, and is disposed in the second space E. The damper mechanism 40 is primarily formed of a drive member 54, a driven member 53 and a plurality of coil or torsion springs 52. The drive member 54 is firmly fixedly coupled to the first piston 39 so as to prevent relative rotation between the piston 39 and drive member 54. The driven member 53 can transmit the torque to the turbine 11. The torsion springs 52 elastically couple the drive member 54 and driven member 53 together in the rotating direction.

More specifically, the drive member 54 is formed of first and second drive plates 54a and 54b. First and second drive plates 54a and 54b are annular plates that are arranged to be axially opposed to each other. The first drive plate 54a is axially adjacent to the transmission side of the disk-like plate 41 of the first piston 39. The second drive plate 54b is arranged on the transmission side of the first drive plate 54a. The outer peripheral portions of the first and second drive plates 54a and 54b are fixedly coupled to the first piston 39 by a plurality of rivets 54c. The inner peripheral portions of the first and second drive plates 54a and 54b are axially spaced from each other. These first and second drive plates 54a and 54b are provided with a plurality of square windows 35 and 36, respectively. The torsion springs 52 are engaged with and located within the plurality of square windows 35 and 36.

As shown in FIG. 10, the first drive plate 54a has an outer peripheral portion that is fixedly coupled to the first piston 39 by rivets 54c. The second drive plate 54b has an outer peripheral portion that is fixedly coupled to the first piston 39 by rivets 54c. Cylindrical portion of first drive plate 54a is provided with a sealing ring 67.

The driven member 53 is an annular plate having an outer peripheral portion, which is located axially between the first and second drive plates 54a and 54b. The driven member 53 is provided with a plurality of windows 53a in the positions corresponding to the square windows 35 and 36 in the drive plates 54a and 54b, respectively. The torsion springs 52 are arranged in the plurality of windows 53a, square windows 35 and square windows 36. Each torsion spring 52 is a coil spring extending in the rotating direction. Each torsion spring 52 is carried in the rotating direction within one of the foregoing windows 53a, one of the square windows 35 and one of the square windows 36. The square windows 35 and 36 in the first and second drive plates 54a and 54b also restrict the axial movement of the torsion springs 52.

The driven member 53 is provided at its inner peripheral portion with a cylindrical portion 53b extending axially toward the transmission. The cylindrical portion 53b is provided with a plurality of claw portions 53c extending axially from its tip end toward the transmission.

The damper mechanism 40 further includes a claw member 80. The claw member 80 is fixedly coupled to the turbine 11 by rivet 24 for rotation together with the turbine 11. The claw member 80 is rotatable and axially movable with respect to the driven member 53. The claw member 80 has an annular portion 80a that is fixedly coupled to the turbine hub 23 together with the turbine shell 20 by the rivets 24. The annular portion 80a is provided with a plurality of claw portions 80b extending radially inward from the inner periphery of the annular portion 80a. The claw portions 80b are engaged with the claw portions 53c of the driven member 53. In this engaged state, the driven member 53 is non-rotatable and axially movable with respect to the turbine 11. A radial space that forms an axial communication space is formed between the claw portions 80b and the second claw portions 53c, which are engaged together.

The outer peripheral surface of the cylindrical portion of the driven member 53 is in contact with the inner peripheral surface of the second drive plate 54b, and thus, is radially supported by second drive plate 54b. In this manner, the driven member 53 is centered with respect to the turbine hub 23 via the second drive plate 54b and the first piston 39.

Accordingly, in the above arrangement, the driven member 53 is not radially positioned directly on the turbine hub 23. In other words, the driven member 53 is spaced from turbine hub 23 in this embodiment. Therefore, it is not necessary to form the splines on the turbine hub 23 for non-rotational engagement between the piston mechanism 37 and the turbine 11. As a result, the total machining or working costs can be reduced.

The piston 38 is axially disposed on the transmission side of the outer peripheral portion of the first piston 39 and radially outside the damper mechanism 40. Specifically, piston 38 is disposed radially outside cylindrical portion of second drive plate 54b. Piston 38 is disposed in the second space E, and is an annular plate. The piston 38 has a second frictional coupling portion 43 axially adjacent the first frictional coupling portion 49. The second frictional coupling portion 43 is located on the transmission side of the first frictional coupling portion 49. The second frictional coupling portion 43 has an annular and flat form as shown in FIG. 9, and has a pressure surface 43a on its engine side. The pressure surface 43a is axially opposed to the second friction member 42b of the first frictional coupling portion 49.

The piston 38 is provided at its outer periphery with a radially outer cylindrical portion 38a. Radially outer cylindrical portion 38a extends axially toward the transmission. The outer cylindrical portion 38a is positioned radially inside the inner peripheral surface of the outer cylindrical portion 8 of the front cover 2 in a radially side by side arrangement. The outer cylindrical portion 38a is provided with teeth 38b. The teeth 38b form radially inward and outward projections in an alternating fashion. The teeth 38b are engaged with the lugs or splines 9 formed on the inner peripheral surface of the outer cylindrical portion 8 of the front cover 2.

Owing to this engagement of the piston 38 with the front cover 2, the piston 38 is non-rotatably and axially movable with respect to the front cover 2. An annular groove is provided in the lugs or splines 9. The groove is provided at the transmission side of the lugs or splines 9, and a wire ring 45 is disposed in the groove. The outer cylindrical portion 38a of the piston 38 has an end surface, on the transmission side. The end surface of the outer cylindrical portion 38a of the piston 38 comes into axial contact with the wire ring 45 so that the axial movement of the piston 38 toward the transmission is restricted. Gaps are formed between the teeth 38b and the lugs or splines 9. These gaps allow axial flow of the working fluid.

The piston 38 is provided at its inner periphery with a radially inner cylindrical portion 46. Inner cylindrical portion 46 extends axially toward the transmission. The inner periphery of the inner cylindrical portion 46 is radially supported by an outer peripheral surface 64 of the cylindrical portion of the second drive plate 54b. Therefore, the inner cylindrical portion 46 is movable in the rotating and axial directions with respect to cylindrical portion of the second drive plate 54b. The outer peripheral surface 64 is provided with an annular groove. A seal ring 67 is disposed in the annular groove. The seal ring 67 is in contact with the inner peripheral surface of the inner cylindrical portion 46. This seal ring 67 seals the spaces on the axially opposite sides of the inner periphery of the piston 38 with respect to each other.

In this manner, a third space F is primarily formed axially between the outer peripheral portion of the first piston 39 and the piston 38. The third space F is closed (sealed) by the foregoing seal ring 67 with respect to the portion of the second space E between the piston 38 and the turbine shell 20. The radially outer side of the third space F is closed (sealed) when the second friction member 42b of first frictional coupling portion 49 contacts second frictional coupling portion 43. The radially outer side of the third space F is opened when the second friction member 42b of first frictional coupling portion 49 is spaced from second frictional coupling portion 43. Since the third space F is formed between the piston 38 and the disk-like plate 41, the number of parts can be reduced, and the structure can be simple. The disk-like plate 41 is provided with a plurality of axial through-apertures 47 located radially inside the first frictional coupling portion 49. The first and third spaces D and F are in fluid communication with each other via these apertures 47.

In view of the above, the clutch coupling portion of the lockup device 4 will be described below. As seen in FIG. 9, the clutch coupling portion is formed of a friction surface 70 of the front cover 2, a first frictional coupling portion 49 of the first piston 39 and a pressure surface 43a of the second frictional coupling portion 43 of the piston 38. Thus, the clutch coupling portion has two friction surfaces. The piston member 38 and the second drive plate 54b rotate relatively to each other when the clutch coupling portion is disengaged. When the clutch coupling portion is engaged, the piston member 38 and the second drive plate 54b rotate together, and sliding in the rotating direction does not occur between the inner cylindrical portion 46 and the cylindrical portion of the second drive plate 54b.

Since the first and second frictional coupling portions 49 and 43 themselves form the pistons which move in the axial direction, the pressing force by the first piston 39 acts between the friction surface 70 and the first friction member 42a The pressing force by the piston 38 acts between the second friction member 42b and the pressure surface 43a.

In this clutch coupling portion, the inner diameter (ID2) of the piston 38 is larger than the inner diameter (ID1 ) of the first piston 39. The different diameters of piston 38 (ID1) and first piston 39 (ID2) are provided so that the pressing force applied from the piston 38 to the first frictional coupling portion 49 is smaller than that in the case where the piston 38 and the first piston 39 have equal inner diameters. Accordingly, the produced pressing force can be smaller than that in the case where the friction surface is merely doubled, and thereby wearing and breakage of the friction members 42 and other members can be prevented. By changing the size of the piston 38, the pressing force acting on the clutch coupling portion can be easily changed. From the above, it can be deemed that the piston 38 has the inner diameter larger than the inner diameter of the piston mechanism 37. The above structure provides the foregoing effects when the piston mechanism 37 is not provided with the damper mechanism 40.

The piston 38, which is the input member rotating together with the front cover 2, is arranged radially outside the damper mechanism 40. More specifically, the piston 38 has an inner diameter larger than the outer diameter of the cylindrical portion of drive plate 54b of the damper mechanism 40, and is located radially outside the damper mechanism 40. Therefore, axial space on one side of the damper mechanism 40 is not restricted. Accordingly, the axial size of the torsion springs 52 (i.e., diameter of each torsion spring) in the damper mechanism 40 can be increased. Such an increase in spring diameter can lower the rigidity or spring constant of torsion springs 52. Therefore, the axial space allows a choice in spring diameters. This facilitates the design and a high performance of torsion springs 52 without the need to change other characteristics of the torsion springs 52. Consequently, the lockup device has a simplified design and it is easy to vary the torsional characteristics of the damper mechanism 40.

The piston 38 is an axially movable piston member, which is radially supported by a portion of the damper mechanism 40. In particular, piston 38 is radially supported by the second drive plate 54b which forms a part of the drive member 54. Thereby, it is not necessary to provide an additional member dedicated to the support of the piston 38, and the whole structure of the lockup device 4 can be simple.

The operation of the lockup device 4 of the torque converter 1 will now be described below. In the disengaged state of the lockup device 4, the first space D is pressurized with the working fluid to separate pistons 38 and 39 from the front cover 2. In other words, the working fluid is supplied from the third oil passage to the radially inner side of the first space D. The working fluid in the first space D flows radially outward to the radially outer portion of the second space E through the gap between the friction surface 70 and the first friction member 42a and through the gap between the lugs or splines 9 and the teeth 38b. The working fluid in the second space E flows into the fluid operating chamber B through the gap between the impeller shell 15 and the turbine shell 20 and through the gap between the outlet of the impeller 10 and the inlet of the turbine 11.

The working fluid moving into the first space D also flows through the apertures 47 formed in the first piston 39 into the third space F. The working fluid in the third space F flows radially outward through a gap between the pressure surface 43a and the second friction member 42b. This working fluid likewise flows through the gap between the lugs or splines 9 and the teeth 38b into the radially outer portion of the second space E.

In this embodiment, since the first piston 39 and the piston 38 function as a pair of pistons that move axially in accordance with changes in hydraulic pressure, the axial movements of these members are very stable. Accordingly, contact between the members in the clutch coupling portion is suppressed. More specifically, the wire ring 45 restricts the axial movement of the piston 38 toward the transmission, while the annular contact portion 23a of the turbine hub 23 restricts the axial movement of the first piston 39. Consequently, as shown in FIG. 9, predetermined clearances are kept between the friction surface 70 and the first friction member 42a, and between the second friction member 44 and the pressure surface 43a respectively, when the first space D is filled with the working fluid moving.

The coupling operation of the lockup device 4 will now be described. The working fluid is drained from the first space D through the third oil passage. Thereby, the working fluid in the first space D flows radially inward, and the working fluid in the third space F flows into the first space D through the apertures 47. Thereby, the first piston 39 moves axially toward the engine, and the first friction member 42a of first frictional coupling portion 49 comes into contact with the friction surface 70 of the front cover 2. The piston 38 likewise moves axially toward the engine so that the pressure surface 43a comes into contact with the second friction member 42b of the first frictional coupling portion 49. Since the first and third spaces D and F are in communication with each other via the apertures 47, the piston 38 can perform and operate smoothly. In other words, the pressure difference acts on both pistons to move both pistons smoothly.

The lockup device 4 is disengaged by supplying the working fluid into the first space D. The working fluid separates the pistons 38 and 39 from each other and separates piston 39 from the front cover 2. Specifically, when the working fluid is supplied through the third oil passage into the first space D, the working fluid moves radially outward, and flows through the apertures 47 into the third space F. As a result, the first piston 39 and the piston 38 axially move toward the transmission. The first piston 39 moves until inner cylindrical portion 71 contacts annular contact portion 23a. Piston 38 moves until outer cylindrical portion 62 contacts wire ring 45. Preferably wire ring 45 and annular contact portion 48 are arranged so piston 38 can axially move more than first piston 39. As described above, the apertures 47 enable the smooth operation of the piston 38. In other words, the pressure difference acts on both pistons to move both pistons smoothly.

Fourth Embodiment

Figure 11:
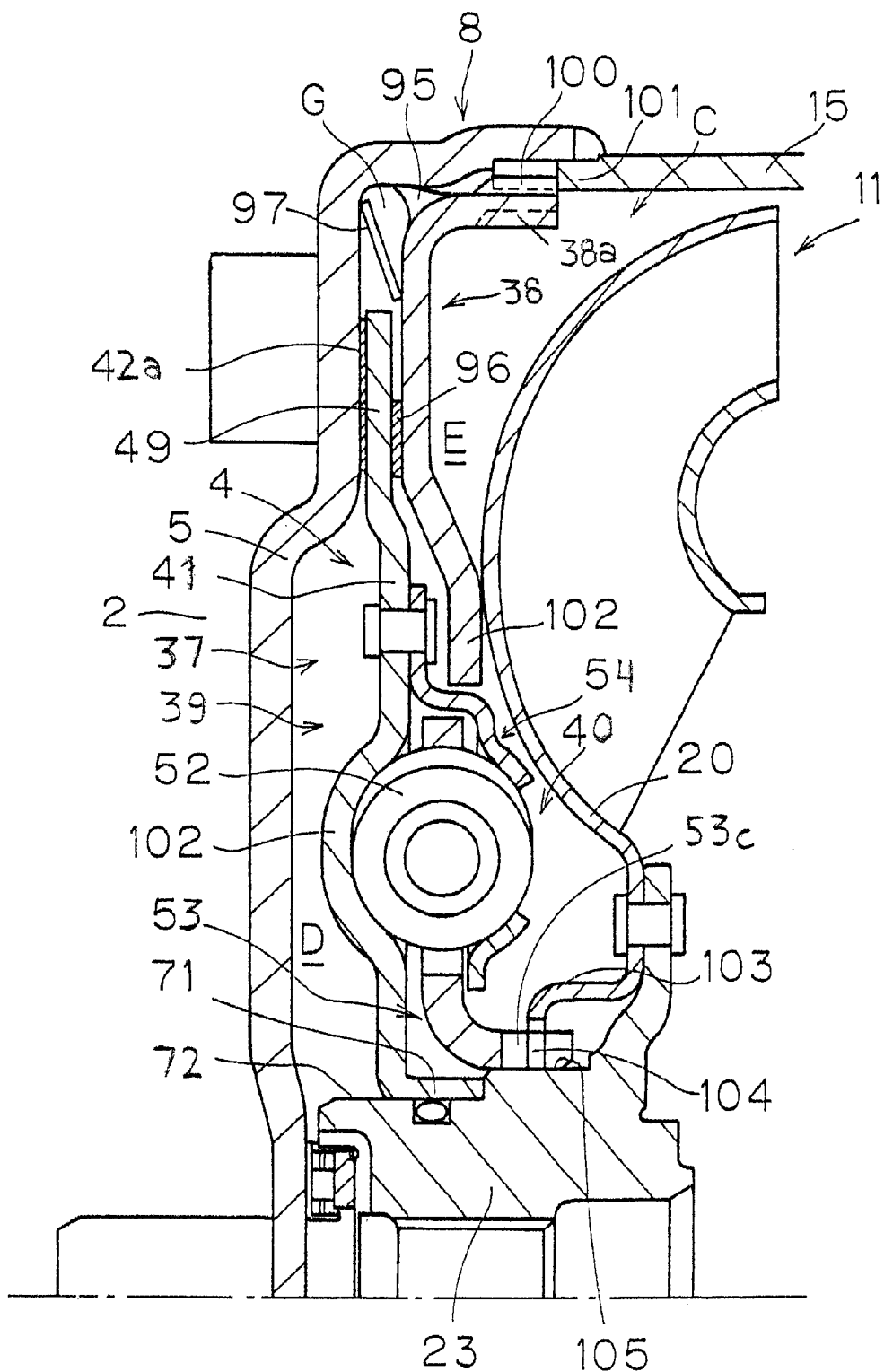
FIG. 11 is a schematic, partial cross sectional view of an upper half of a torque converter with a lockup device having a damper mechanism in accordance with a fourth embodiment of the present invention.

Referring now to FIG. 11, the lockup device 4 has been modified in accordance with a fourth embodiment of the present invention. The fourth embodiment is substantially the same as the third embodiment, except for portions that have been modified as explained below. Since this embodiment is substantially the same as the third embodiment, this embodiment will not be discussed or illustrated in detail herein. Moreover, since this embodiment is substantially the same as the third embodiment, identical or substantially identical parts will be identified with the same reference numerals as the third embodiment.

Specifically, the third embodiment has been modified such that the inner peripheral surface of the piston 38 is not in contact with the piston mechanism 37 in this embodiment. Therefore, the inner peripheral surface of the piston 38 is not supported by the piston mechanism 37 in this embodiment. This structure creates an arrangement where the spaces on the axially opposite sides of the piston 38 are in fluid communication with each other via a space radially inside the piston 38.

The radially outer portion of the piston 38 extends radially outward beyond the radially outer peripheral portion of first frictional coupling portion 49 of the first piston 39. The radially outer portion of the piston 38 is located substantially close to the outer cylindrical portion 8 of the front cover 2. An annular fourth space G is kept radially outside the first piston 39. The fourth space G is axially located between the main body 5 of the front cover 2 and the outer peripheral portion of the piston 38.

An annular seal member 95 contacts the inner peripheral surface of the outer cylindrical portion 8 of the front cover 2 and is fixedly coupled to the outer peripheral surface of the piston 38. A space is formed between the outer cylindrical portion 8, the outer peripheral portion of the piston 38 and the seal member 95. The seal member 95 connected to the piston 38 also form part of the periphery of the fourth space G such that the seal member 95 and the piston 38 act as a divider to seal the spaces.

As described above, the fourth space G has a radially outer portion sealed by the seal member 95. The fourth space G also has a radially inner portion that is closed by the clutch coupling portion in the engaged position. A conical spring 97 is located in the fourth space G. The conical spring 97 is axially and elastically deformed at least when the piston 38 moves axially to an end position on the engine side (i.e., the position achieving the lockup device engaged state). Therefore, the conical spring 97 biases the piston 38 to move away from the front cover 2 at least in the lockup device engaged state.

The first and second friction members 42a and 96, which are fixedly coupled to the first frictional coupling portion 49 of the first piston 39, will now be described in more detail. The first friction member 42a is the same as that in the third embodiment. The second friction member 96 replaces the second friction member 42b of the third embodiment. The second friction member 96 has an inner diameter equal to the inner diameter of the first friction member 42a, but has an outer diameter smaller than the outer diameter of the first friction member 42a. As a result, the radial width of the second friction member 96 is preferably about half the radial width of the first friction member 42a. In the lockup device engaged state, only the radially inner portion of the pressure surface 43a of the piston 38 is in contact with the second friction member 96. The radially outer portion of the pressure surface 43a is spaced from the corresponding radial portion of the first frictional coupling portion 49 not carrying the second friction member 96, in the lockup device engaged state. The space between the radially outer portion of the pressure surface 43a and the corresponding radial portion of the first frictional coupling portion 49 forms a portion of the foregoing fourth space G.

In this embodiment, the impeller shell 15 is provided with lugs or splines 100 in contrast to the first embodiment, which utilizes lugs or splines formed on the outer cylindrical portion 8 of front cover 2. Further, the impeller shell 15 is provided with a socket portion 101 that is axially opposed to the outer cylindrical portion 38a of the piston 38.

Additionally, the inner peripheral surfaces of the axially extending second claw portions 53c of the driven member 53 are radially supported by a second outer peripheral surface 105 of the turbine hub 23 in this embodiment. Also, a first engagement portion 103 replaces the first engagement portion 80 of the third embodiment. First engagement portion 103 has a plurality of claw portions 104 and is integrally formed with the turbine shell in this embodiment. Preferably, first engagement portion 103 is formed as a one-piece unitary member with the turbine shell. The claw portions 104 of the first engagement portion 103 are non-rotatably coupled to the claw portions 53c of the driven member 53 so the driven member and turbine rotate together. The claw portions 53c are axially movable with respect to the claw portions 104.

The first drive plate 54a of the third embodiment has been eliminated in this embodiment. Alternatively, the first piston 39 has been modified to support the torsion springs 52 and functions as a damper casing. More specifically, the first piston 39 is provided with a spring support portion 102. The spring support portion 102 supports the radially opposite sides of the torsion springs 52. The spring support portion 102 is an axially projected portion formed by drawing or the like. The spring support portion 102 is not provided with an axial aperture or recess. In the spring support portion 102, the portions in contact with the torsion springs 52 are subjected to a predetermined thermal treatment or the like during the manufacturing process. As described above, the first piston 39 functions as a damper casing of the damper mechanism 40. Therefore, one of the drive plates (i.e., drive plate 54a in this case) can be eliminated. As a result, the required parts can be reduced in number, and the whole structure can be simple.

During the disengagement of the lockup device 4, the working fluid is supplied from the third oil passage into the first space D. The working fluid in the first space D moves radially outward, and flows into the fourth space G through a gap between the friction surface 70 of the front cover 2 and the first friction member 42a. The working fluid in the fourth space G then flows radially inward through a gap between the second friction member 96 and the pressure surface 43a The working fluid further flows into the second space E through the gap between the inner peripheral portion of the piston 38 and the damper mechanism 40.

In this state, the conical spring 97 restricts the axial movement of the piston 38 toward the engine. Therefore, a drag torque can be suppressed when the lockup device 4 is in the disengaged state.

When the working fluid is drained from the first space D through the third oil passage, the first piston 39 and the piston 38 move axially toward the engine. Thereby, the first friction member 42a is pressed against the friction surface 70, and the pressure surface 43a is pressed against the second friction member 96. In this embodiment, since the second friction member 96 has a smaller effective radius than the second friction member 42b of the first embodiment, the torque that can be transmitted by the second friction member 96 can be smaller than that in the first embodiment. In this embodiment, however, the second friction member 96 has a smaller surface area due to the smaller outer diameter, and thereby has a receiving area to receive an increased pressure. By appropriately determining the pressure on the piston 38, therefore, the second friction member 96 can be configured to transmit a torque equal to or larger than that in the prior art.

When the working fluid is supplied from the third oil passage into the first space D, the first piston 39 and the piston 38 move axially toward the transmission to disengage the lockup device. At the same time, the conical spring 97 reliably and smoothly moves the piston 38 toward the transmission.

Fifth Embodiment

Figure 12:
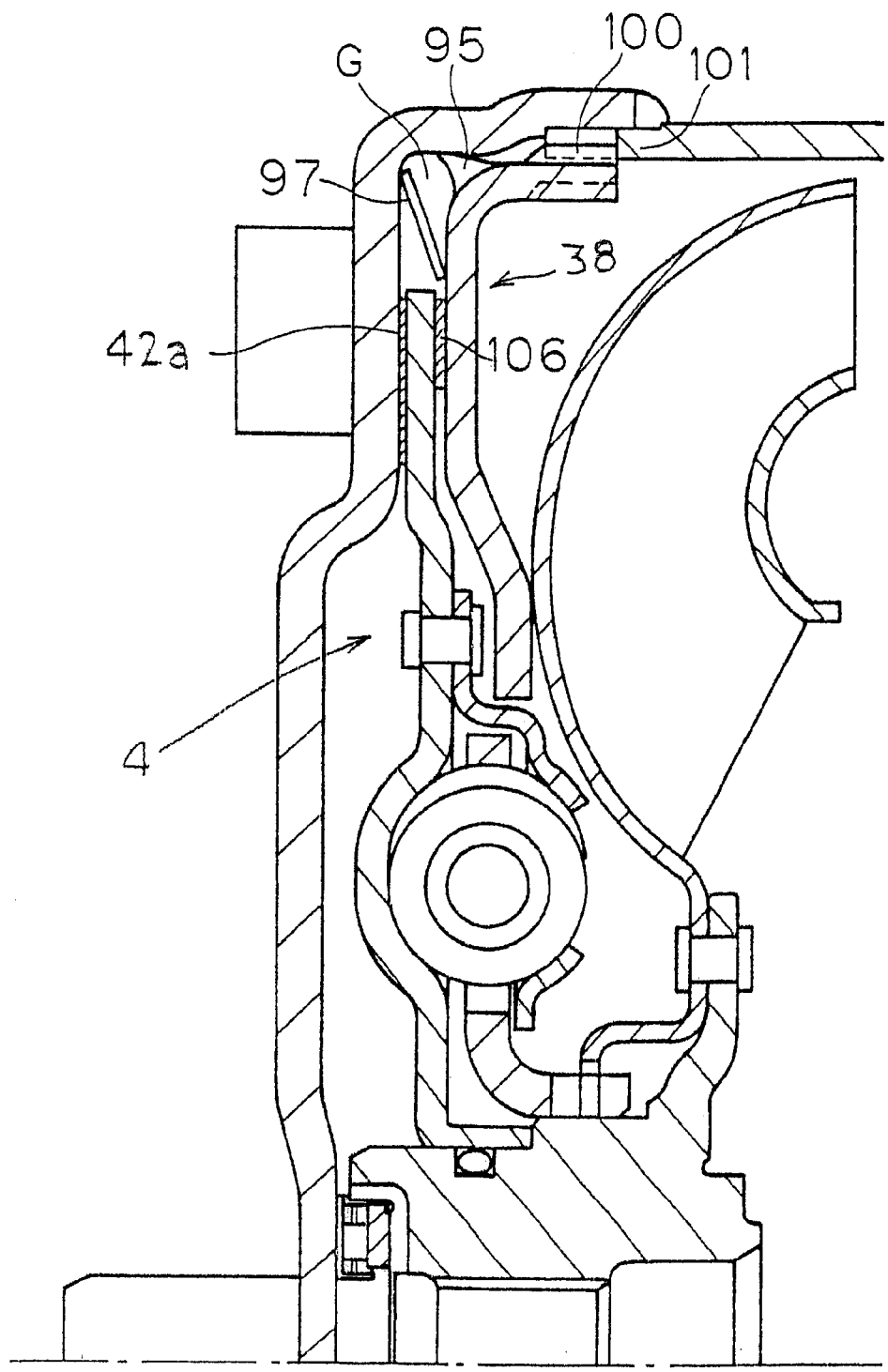
FIG. 12 is a schematic cross sectional view of an upper half of a torque converter with a lockup device having a damper mechanism in accordance with a fifth embodiment of the present invention.

Referring now to FIG. 12, the lockup device 4 has been modified in accordance with a fifth embodiment of the present invention. The fifth embodiment is substantially the same as the fourth embodiment, except for portions that have been modified as explained below. Since this embodiment is substantially the same as the fourth embodiment, this embodiment will not be discussed or illustrated in detail herein. Moreover, since this embodiment is substantially the same as the fourth embodiment, identical or substantially identical parts will be identified with the same reference numerals as the fourth embodiment.

Specifically, the fourth embodiment has been modified such that a second friction member 106 is provided in this embodiment that replaces the second friction member 96 of the fourth embodiment. The second friction member 106 has the substantially same outer diameter as the first friction member 42a, but has a larger inner diameter. Therefore, the radial width of the second friction member 106 is preferably about half the radial width of the first friction member 42a. The friction surface defined between the second friction member 106 and the pressure surface 43a has a larger effective radius than that defined by the first friction member 42a. Therefore, the torque being transmitted through the second friction member 106 can be increased. Thereby, the torque being transmitted through the second friction member 106 can be equal to or larger than the torque being transmitted through the first friction member 42a, even if the pressing force applied by the piston 38 is smaller than that applied by the first piston 39.

Sixth Embodiment

Figure 13:
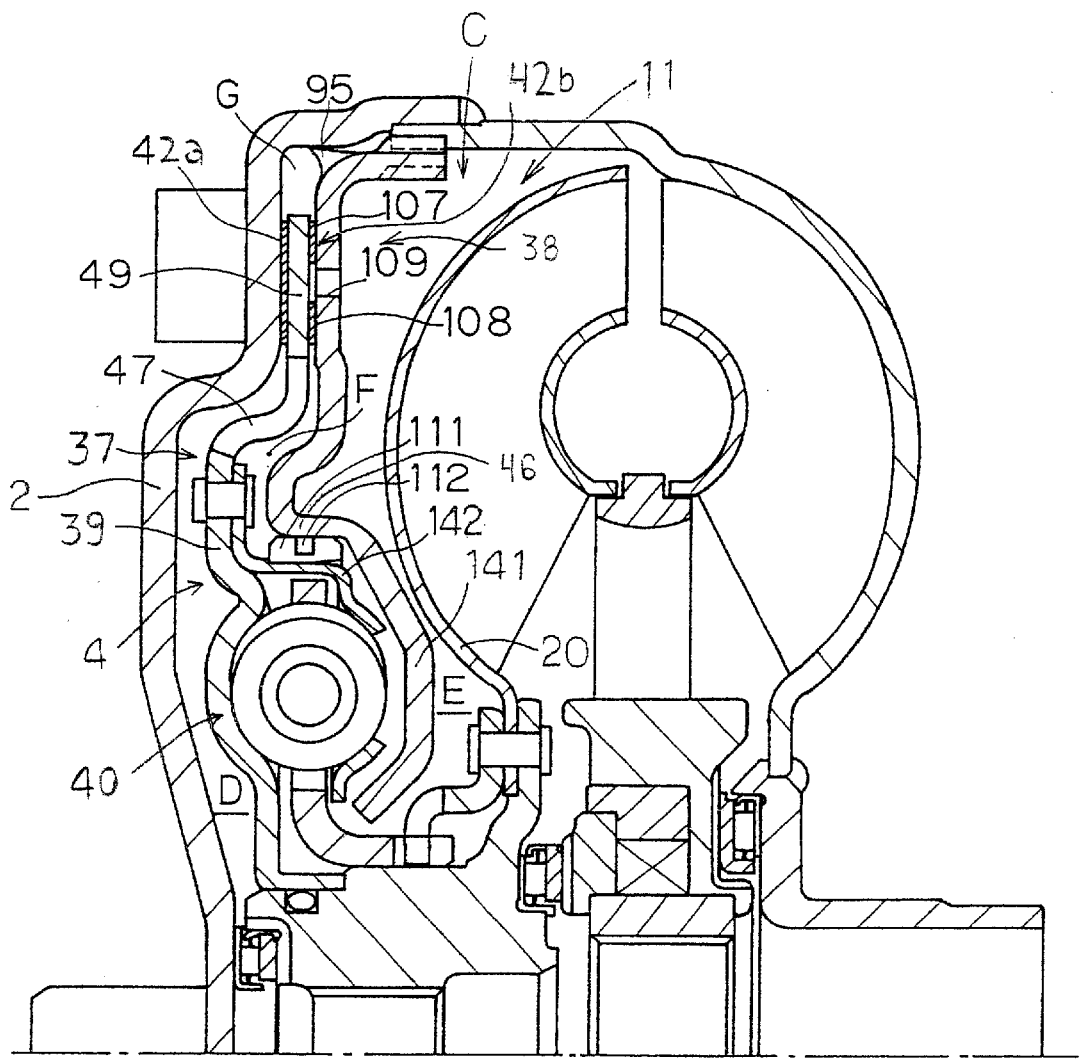
FIG. 13 is a schematic cross sectional view of an upper half of a torque converter with a lockup device having a damper mechanism in accordance with a sixth embodiment of the present invention.

Referring now to FIG. 13, the lockup device 4 has been modified in accordance with a sixth embodiment of the present invention. The sixth embodiment is substantially the same as the third embodiment, except for portions that have been modified as explained below. Since this embodiment is substantially the same as the third embodiment, this embodiment will not be discussed or illustrated in detail herein. Moreover, since this embodiment is substantially the same as the third embodiment, identical or substantially identical parts will be identified with the same reference numerals as the third embodiment.

Specifically, the third embodiment has been modified in this embodiment such that a fourth space G is formed axially between the piston 38 and the front cover 2. The fourth space G is formed axially between the piston 38 and the front cover 2. The fourth space G is located radially outside the first frictional coupling portion 49 of the first piston 39, and is the same as the fourth space G in the fourth and fifth embodiments. In this embodiment, third space F is formed axially between the piston 38 and the outer peripheral portion of the first piston 39, and is similar to the space F in the third embodiment.

The third space F is in communication with the first space D through the apertures 47 formed in the first piston 39. The inner peripheral portion of the third space F is sealed with respect to the second space E by a seal mechanism. The seal mechanism is formed of a collar 111 and a seal ring 112. More specifically, the collar 111 is welded to the outer periphery of a drive plate 142. The drive plate 142 replaces the first and second drive plates 54a and 54b of the third embodiment.

The collar 111 is a cylindrical member and forms the outer peripheral surface of the drive plate 142. The collar 111 is provided at its outer peripheral surface with an annular groove. A seal ring 112 is disposed in the annular groove of the collar 111. The seal ring 112 contacts an inner peripheral surface of the piston 38. In this manner, the inner peripheral surface of the inner cylindrical portion 46 of the piston 38 is radially supported on the outer peripheral surface of the collar 111.

The second friction coupling portion 43 of the piston 38 is provided with a plurality of axial through-apertures 109. The apertures 109 are arranged circumferentially on the same circle. The apertures 109 are configured such that the fluid communication of the third and fourth spaces F and G to the second space E is prevented when the piston 38 is in contact with the second friction member 42b. The above communication arrangement is established when the piston 38 is axially spaced from the second friction member 42b. In this embodiment, the second friction member 42b is provided with an annular groove located in the radial position corresponding to the radial positions of apertures 109. This annular groove has a larger radial length than the apertures 109 so that the apertures 109 are located within the annular groove. In other words, the second friction member 42b is formed of a radially outer friction member 107 and a radially inner friction member 108, and the annular groove between the members 107 and 108 corresponds to the radial locations of the apertures 109.

When the clutch coupling portion is in the disengaged state, the working fluid is supplied from the third oil passage into the first space D. The working fluid then moves radially outward in the first space D, and flows through the apertures 47 into the third space F. The working fluid flows through the gap between the friction surface 70 and the first friction member 42a into the fourth space G. The working fluid in the third space F flows radially outward through a gap between the radially inner friction member 108 and the pressure surface 43a, and flows through the apertures 109 into the second space E. The working fluid in the fourth space G flows into the second space E through the gap between the radially outer friction member 107 and the pressure surface 43*a*, and flows through the apertures 109.

When the oil is drained from the first space D through the third oil passage, the working fluid in the third space F flows through the apertures 47 into the first space D. The working fluid in the fourth space G flows radially inward along the sides of the first and second friction members 42*a* and 42*b*. As a result, the first piston 39 and the piston 38 axially move toward the engine so that the first friction member 42*a* is pressed against the friction surface 70, and the pressure surface 43*a* is pressed against the second friction member 42*b*. In this manner, the lockup device 4 is engaged. In this embodiment, a pressure receiving portion of the piston 38 is enlarged radially inwardly and outwardly beyond the second friction member 42*b*. Since the pressure receiving portion of the piston 38 is enlarged, the pressing force acting from the piston 38 to the second friction member 42*b* can be large. As a result, the transmission torque of the lockup device 4 is increased.

The piston 38 has a stirring portion 141, which extends radially inward from the radially inner portion of the third space F. The stirring portion 141 is an annular portion extending radially inward from the inner cylindrical portion 46 of the piston 38. The stirring portion 141 extends between the damper mechanism 40 and the turbine shell 20. The stirring portion 141 has an inner periphery extended to the vicinity of the second claw portions 53*c* of the driven member 53.

The function of the stirring portion 141 will now be described in more detail. In the lockup device 4 of this embodiment, the first piston 39 divides the space C into the first and second spaces D and E. The first space D is a space through which the working fluid can be supplied and drained from the third oil passage. In contrast to this, the second space E is a space that is primarily located between the piston mechanism 37 and the turbine 11. The piston mechanism 37 and the turbine 11 are non-rotatably coupled together. The working fluid does not usually flow in the second space E. In this case, even in the disengaged state of the lockup device 4, the working fluid flows in the first space D, and the working fluid does not flow through a major portion of the second space E. Therefore, the hydraulic pressure in the first space D may become lower than that in the second space E due to the flow of the working fluid. If such a pressure difference arises, the first piston 39 and the piston 38 may axially move toward the engine. This axial movement would cause contact between the members in the clutch coupling portion. Such contact would cause a drag torque.

In this embodiment, the piston 38 is arranged in the second space E as an input member rotating together with the front cover 2. Additionally, piston 38 has a portion located in the radially inner portion of the second space E. Therefore, the working fluid can be stirred and flowed in the second space E by stirring portion 141. Thereby, a balance in pressure is kept between the first and second spaces D and E. This balance in pressure between the first and second spaces D and E helps prevent the axial movement of the first piston 39 or piston 38 toward the engine. Consequently, the drag torque can be smaller than that in the structure without the stirring portion 141.

Seventh Embodiment

Figure 14:
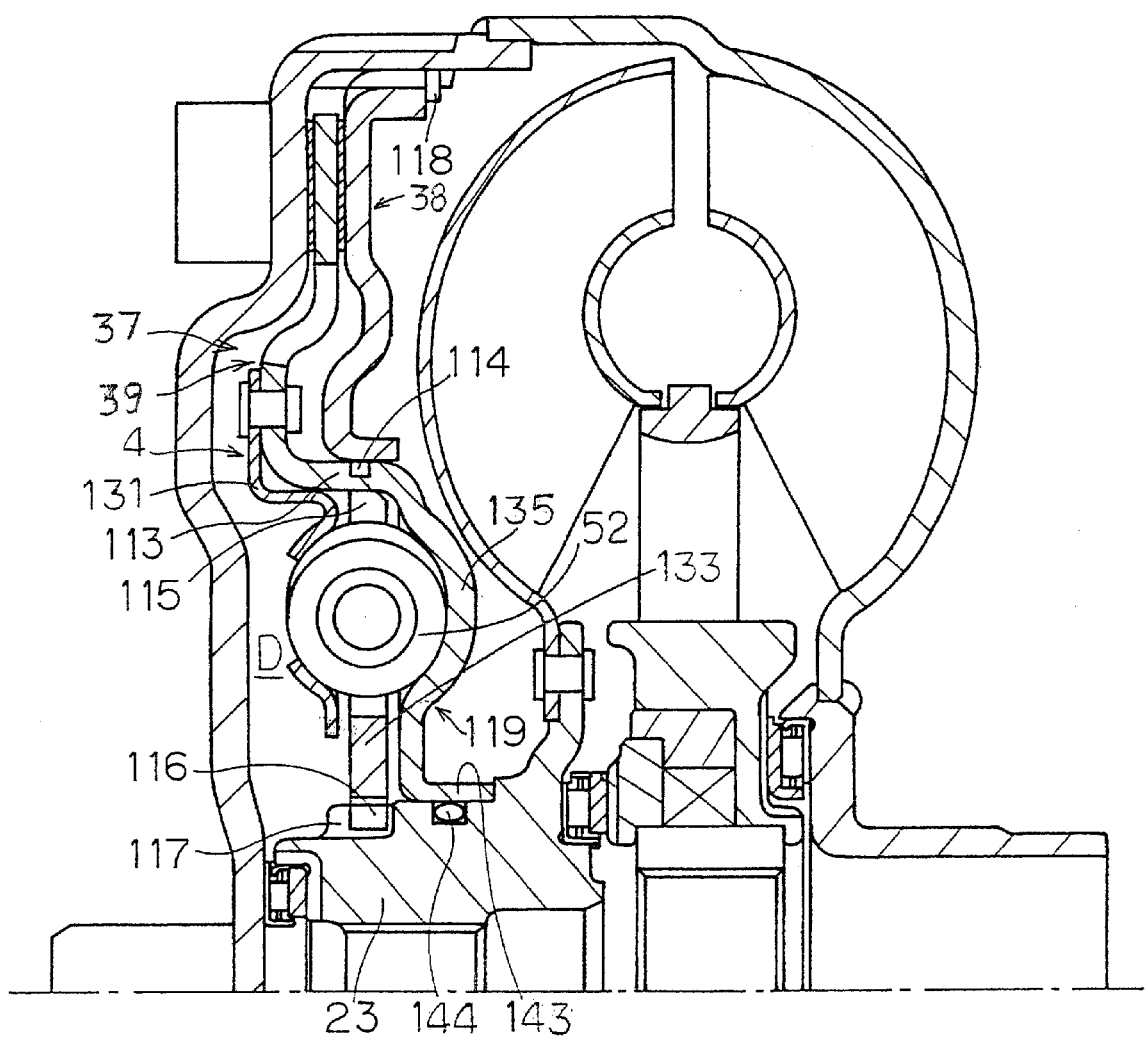
FIG. 14 is a schematic cross sectional view of an upper half of a torque converter with a lockup device having a damper mechanism in accordance with a seventh embodiment of the present invention.

Referring now to FIG. 14, the lockup device 4 has been modified in accordance with a seventh embodiment of the present invention. The seventh embodiment is substantially the same as the third embodiment, except for portions that have been modified as explained below. Since this embodiment is substantially the same as the third embodiment, this embodiment will not be discussed or illustrated in detail herein. Moreover, since this embodiment is substantially the same as the third embodiment, identical or substantially identical parts will be identified with the same reference numerals as the third embodiment.

Specifically, the third embodiment has been modified such that a snap ring 118 is fixedly coupled to the lugs or splines 9 of the front cover 2 in this embodiment. The snap ring 118 is axially opposed to the outer cylindrical portion 38*a* of the piston 38, and is provided for the purpose of restricting the axial movement of the piston 38 toward the engine.

The first piston 39 has been modified to have a radially inner portion that is axially shifted toward the transmission with respect to its radially outer portion. The piston 38 has the inner peripheral surface which is rotatably and axially movably supported by a cylindrical portion 113 formed on the radially middle portion of the first piston 39. The cylindrical portion 113 of the first piston 39 is provided at its outer peripheral surface with an annular groove. A seal ring 114 is arranged in the annular groove. The seal ring 114 is in contact with the inner peripheral surface of the piston 38 for sealing the spaces on the axially opposite sides of the piston 38 from each other. The first piston 39 is provided at its inner periphery with an inner cylindrical portion 143 extending axially toward the transmission. The inner cylindrical portion 143 is radially supported by the outer peripheral surface of the turbine hub 23. The turbine hub 23 is provided at its outer peripheral surface with an annular groove. A seal ring 144 is arranged in the annular groove of the turbine hub 23. The seal ring 144 is in contact with the inner peripheral surface of the inner cylindrical portion 143 of the first piston 39.

A damper mechanism 119 is axially located on the engine side of the inner peripheral portion of the first piston 39. Therefore, damper mechanism 119 is located in the first space D. The damper mechanism 119 is formed of a drive plate 131, the torsion springs 52 and a driven member 133. The drive plate 131 replaces the first and second drive plates 54*a* and 54*b* of the third embodiment. The drive plate 131 has a radially outer portion fixedly coupled to the first piston 39. The drive plate 131 axially supports the engine side of the torsion springs 52. The first piston 39 has a spring support 135 that axially supports the transmission side of the torsion springs 52. The spring support portion 135 also circumferentially supports the opposite radial ends of the torsion springs 52. The driven member 133 is a disk-like member provided at its inner periphery with teeth 116. The teeth 116 are non-rotatably and axially movably engaged with teeth 117. Teeth 117 are formed on the outer periphery of the turbine hub 23. Spaces extending over the entire axial lengths of the teeth 116 and 117 are formed between these teeth 116 and 117.

The driven member 133 has an outer peripheral portion 115. The outer peripheral surface of the outer peripheral portion 115 is radially supported by the inner peripheral surface of the cylindrical portion 113 of the first piston 39.

Eighth Embodiment

Figure 15:
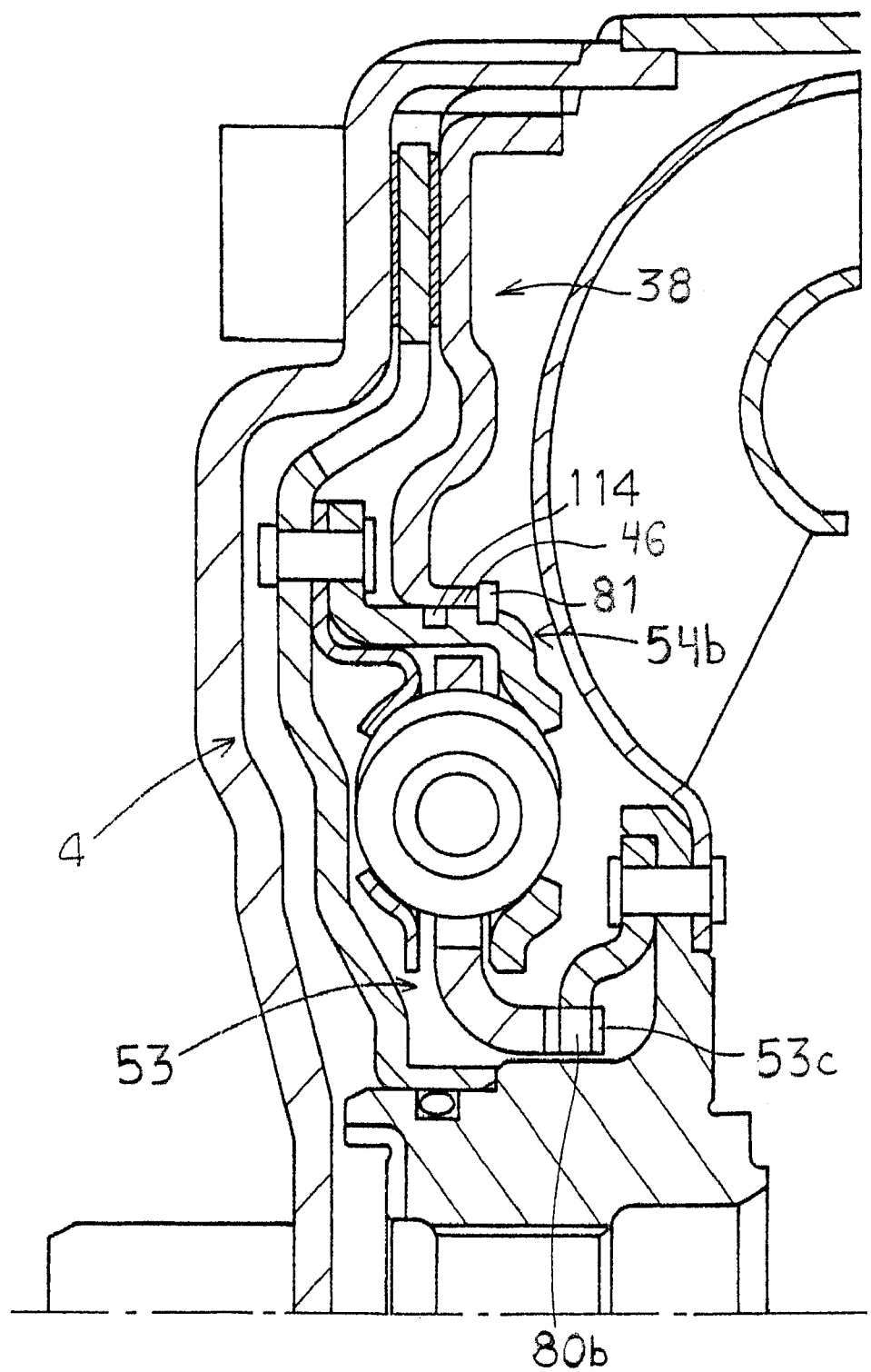
FIG. 15 is a schematic, partial cross sectional view of an upper half of a torque converter with a lockup device having a damper mechanism in accordance with an eighth embodiment of the present invention.

Referring now to FIG. 15, the lockup device 4 has been modified in accordance with a eighth embodiment of the present invention. The eighth embodiment is substantially the same as the third embodiment, except for portions that have been modified as explained below. Since this embodiment is substantially the same as the third embodiment, this embodiment will not be discussed or illustrated in detail herein. Moreover, since this embodiment is substantially the same as the third embodiment, identical or substantially identical parts will be identified with the same reference numerals as the third embodiment.

Specifically, the third embodiment has been modified such that a snap ring 81 is arranged on the outer peripheral surface of the second drive plate 54b in this embodiment. The wire ring 45 of the third embodiment has been removed. The snap ring 81 is axially opposed to the inner cylindrical portion 46 of the piston 38. In the third embodiment axial movement of the piston 38 is restricted at the radially outer portion of the piston 38 by the wire ring 45. In this eighth embodiment, axial movement of the piston 38 is restricted at the radially inner portion of the piston 38 by the snap ring 81.

Additionally, the first claw portions 80b radially position the driven member 53 in this embodiment. The drive plate 54b in the third embodiment radially positions the driven member 53. The inner peripheral surfaces of the claw portions 80b are in contact with the outer peripheral surfaces of the claw portions 53c to radially position the driven member 53.

Ninth Embodiment

Figure 16:
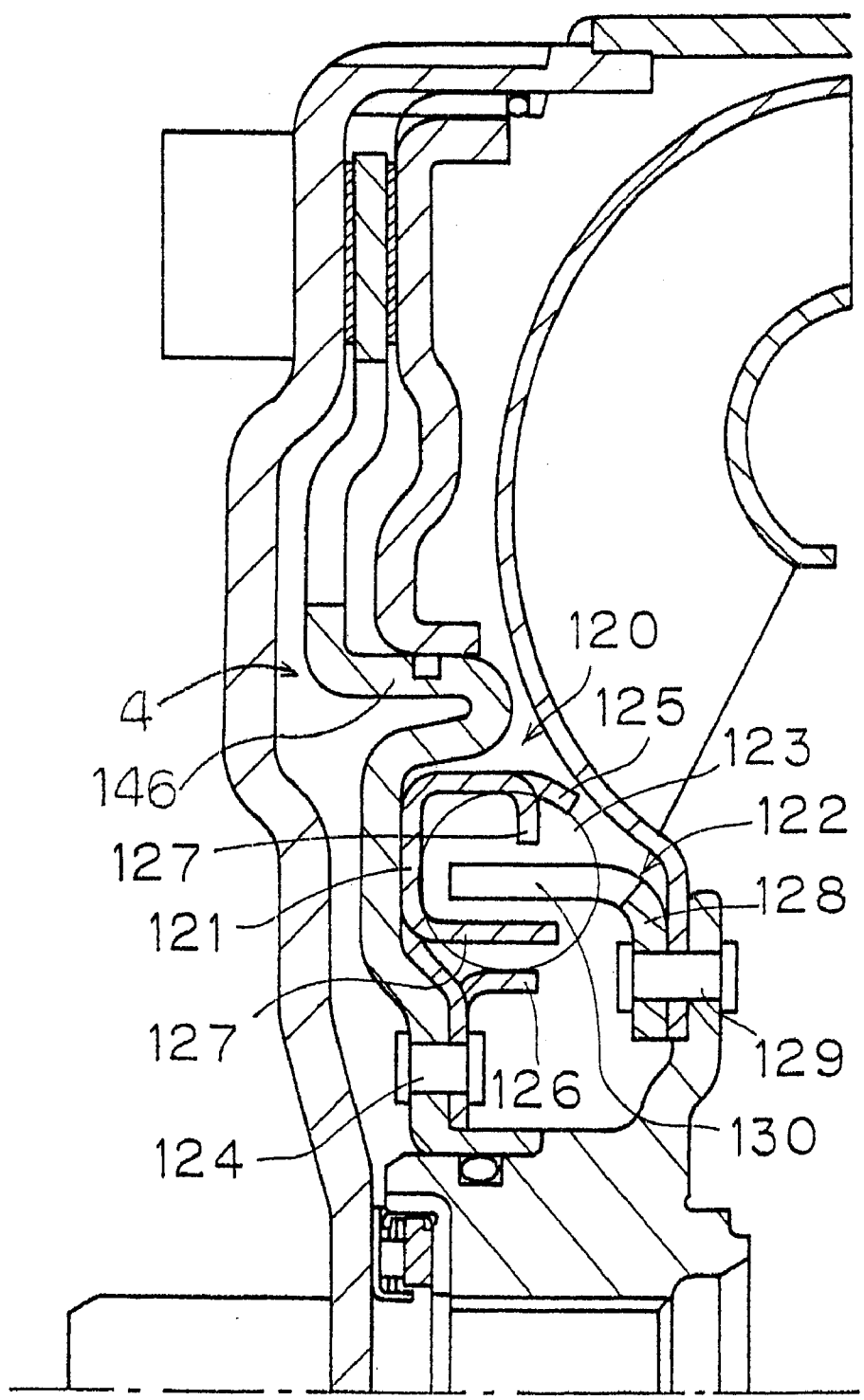
FIG. 16 is a schematic, partial cross sectional view of an upper half of a torque converter with a lockup device having a damper mechanism in accordance with a ninth embodiment of the present invention.

Referring now to FIG. 16, the lockup device 4 has been modified in accordance with a ninth embodiment of the present invention. The ninth embodiment is substantially the same as the third embodiment, except for portions that have been modified as explained below. Since this embodiment is substantially the same as the third embodiment, this embodiment will not be discussed or illustrated in detail herein. Moreover, since this embodiment is substantially the same as the third embodiment, identical or substantially identical parts will be identified with the same reference numerals as the third embodiment Specifically, the third embodiment has been modified such that the first piston 39 is provided at its radially middle portion with a cylindrical portion 146 in this embodiment. The cylindrical portion 146 supports the inner peripheral portion of the piston 38.

Additionally, a damper mechanism 120 in this embodiment replaces the damper mechanism 40 of the third embodiment. The damper mechanism 120 is located on the transmission side of the inner peripheral portion of the first piston 39. The damper mechanism 120 is primarily formed of a drive plate 121, a driven plate 122 and a plurality of torsion springs 123. The drive plate 121 is an annular plate, and is located on the transmission side of the first piston 39. The drive plate 121 is firmly fixedly coupled to the inner peripheral portion of the first piston 39. More specifically, the drive plate 121 is in contact with the first piston 39, and the inner peripheral portion of the drive plate 121 is fixedly coupled to the first piston 39 by a plurality of rivets 124. The drive plate 121 is provided with supports 125 and 126 for supporting the radially opposite sides of each torsion spring 123. The drive plate 121 is also provided supports 127 for supporting the circumferentially opposite ends of the torsion springs 123. The driven plate 122 has an annular portion 128 fixedly coupled to the turbine hub 23 by a plurality of rivets 129. The driven plate 122 also has claws 130 which extend axially toward the engine, and are engaged with the circumferentially opposite ends of each torsion spring 123.

Tenth Embodiment

Figure 17:
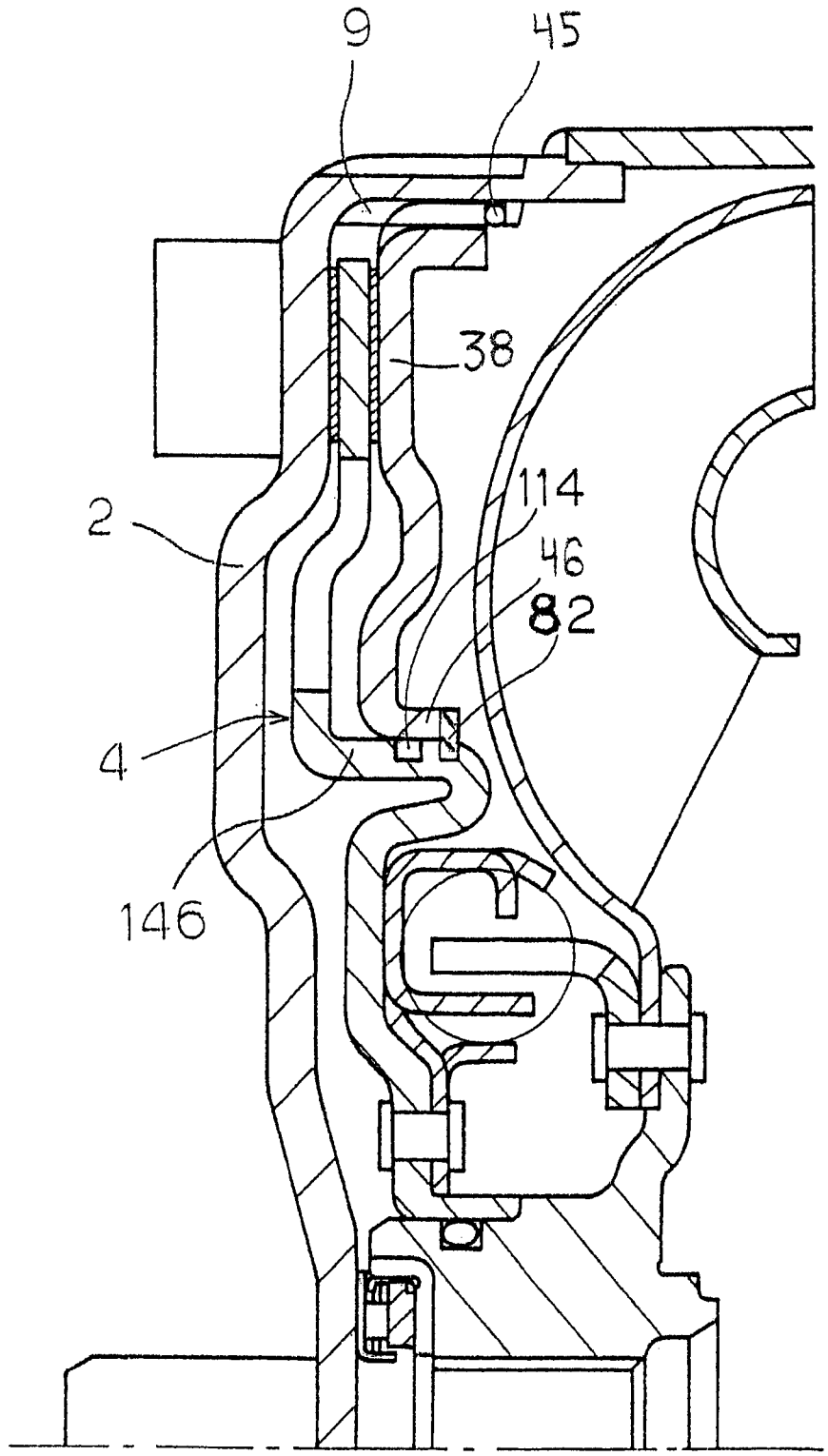
FIG. 17 is a schematic, partial cross sectional view of an upper half of a torque converter with a lockup device having a damper mechanism in accordance with a tenth embodiment of the present invention.

Referring now to FIG. 17, the lockup device 4 has been modified in accordance with an tenth embodiment of the present invention. The tenth embodiment is substantially the same as the ninth embodiment, except for portions that have been modified as explained below. Since this embodiment is substantially the same as the ninth embodiment, this embodiment will not be discussed or illustrated in detail herein.

Specifically, the ninth embodiment has been modified such that a snap ring 82 is arranged on a cylindrical portion 146 of the first piston 39 in this embodiment. The snap ring 82 is opposed to the inner cylindrical portion 46 of the piston 38. In this embodiment, the axial movement of the radially outer portion of the piston 38 is also restricted. More specifically, a wire ring 45 is arranged on the lugs or splines 9 of the front cover 2, similarly to the first and seventh embodiments. However, in the tenth embodiment, since the radially inner and outer portions of the piston 38 are restricted against axial movement, the position and attitude of the piston 38 in the lockup device disengaged state can be stable.

In the lockup device of the torque converter according to the present invention, the driven member is divided into the portion for performing the torque transmission and the portion that is radially supported. Therefore, it is not necessary to machine or work the turbine hub for forming a spline or splines. Consequently, the structure can be simple and the working cost can be low, compared with the prior art.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A lockup device adapted to be used in a torque converter having a front cover with a friction surface on its inner side, an impeller and a turbine, said lockup device being adapted to be disposed in a space between the turbine and the front cover for mechanically engaging and disengaging the front cover to the turbine, said lockup device comprising:

a plate disposed adjacent a friction surface of the front cover;

a damper mechanism arranged to elastically couple said plate and the turbine in a rotating direction, said damper mechanism having a drive member for receiving a torque from said plate, a driven member for outputting the torque to said turbine, and at least one torsion spring for elastically coupling said drive member and said driven member together in the rotating direction;

a piston adapted to move within the space in accordance with pressure changes in the space, said piston being an annular member disposed on a side of said plate away from the friction surface of the front cover, said piston being non-rotatably coupled to said front cover, but axially movable relative to said front cover, said piston having an inner diameter that is larger than an outer diameter of said driven member of said damper mechanism, said piston being arranged radially outside of said driven member of said damper mechanism.

2. The lockup device according to claim 1, wherein
said piston has an inner peripheral surface that is relatively non-rotatably and axially movably supported by one of said plate and said drive member.

3. The lockup device according to claim 2, wherein
said piston and said plate form a pressure space therebetween, and said lockup device further includes a seal mechanism providing an axial seal between said inner peripheral surface of said piston and said one of said plate and said drive member.

4. The lockup device according to claim 1, wherein
said driven member is provided with a window with said torsion spring being disposed in said window, said drive member being formed of a pair of circular plates arranged on axially opposite sides of said driven member and supporting said torsion spring, and said driven member has a circumferentially extending recess with a fixing member located within said recess for fixing said pair of circular plates together and for limiting a relative rotation between said drive and driven members when said fixing member comes into contact with a circumferential end of said recess.

5. A lockup device adapted to be used in a torque converter having a front cover with a friction surface on its inner side, an impeller and a turbine, said lockup device being adapted to be disposed in a space between the turbine and the front cover for mechanically engaging and disengaging the front cover to the turbine, said lockup device comprising:

a plate disposed adjacent a friction surface of the front cover;

a damper mechanism arranged to elastically couple said plate and the turbine in a rotating direction, said damper mechanism having a drive member for receiving a torque from said plate, a disk-like driven member for outputting the torque to the turbine, and at least one torsion spring for elastically coupling said drive member and said driven member together in the rotating direction, an annular piston adapted to move axially in the space in accordance with pressure changes in the space, and disposed on a side of said plate away from the friction surface of the front cover; said piston having an inner peripheral surface relatively rotatably and axially movably supported by an outer peripheral surface of said driven member; and a seal mechanism disposed between said outer peripheral surface of said driven member and said inner peripheral surface of said piston for sealing spaces on axially opposite sides from each other.

6. The lockup device according to claim 5, wherein
said outer peripheral surface of said driven member has an annular groove, and said seal mechanism has an annular seal member disposed in said groove for contacting said inner peripheral surface of said piston.

7. The lockup device according to claim 6, wherein
said driven member is provided with a window with said torsion spring being disposed in said window, said drive member being formed of a pair of circular plates arranged on axially opposite sides of said driven member and supporting said torsion spring.

8. The lockup device according to claim 7, wherein
said driven member has a circumferentially extending recess with a fixing member located within said recess for fixing said pair of circular plates together and for limiting a relative rotation between said drive and driven members when said fixing member comes into contact with a circumferential end of said recess.

9. The lockup device according to claim 5, wherein
said driven member is provided with a window with said torsion spring being disposed in said window, said drive member being formed of a pair of circular plates arranged on axially opposite sides of said driven member and supporting said torsion spring.

10. The lockup device according to claim 9, wherein
said driven member has a circumferentially extending recess with a fixing member located within said recess for fixing said pair of circular plates together and for limiting a relative rotation between said drive and driven members when said fixing member comes into contact with a circumferential end of said recess.

11. A torque converter adapted to be used to transmit torque from a power input shaft to an output shaft, said torque converter comprising:

a front cover being adapted to be coupled to the power input shaft, said front cover being provided at an inner side with a friction surface;

an impeller connected to said front cover to form a hydraulic chamber together with said front cover;

a turbine disposed opposite said impeller and disposed inside said hydraulic chamber, said turbine being adapted to be coupled to the output shaft, said front cover and said turbine forming a space therebetween;

a stator disposed between said impeller and said turbine; and a lockup device disposed in said space for mechanically engaging and disengaging said front cover with respect to said turbine, said lockup device including a plate disposed adjacent a friction surface of the front cover, a damper mechanism arranged to elastically couple said plate and the turbine in a rotating direction, said damper mechanism having a drive member for receiving a torque from said plate, a driven member for outputting the torque to said turbine, and at least one torsion spring for elastically coupling said drive member and said driven member together in the rotating direction, and a piston adapted to move within said space in accordance with pressure changes in said space, said piston being an annular member disposed on a side of said plate away from the friction surface of the front cover, said piston being non-rotatably coupled to said front cover, but axially movable relative to said front cover, said piston having an inner diameter that is larger than an outer diameter of said driven member of said damper mechanism, said piston being arranged radially outside of said driven member of said damper mechanism.

12. The torque converter according to claim 11, wherein
said piston has an inner peripheral surface that is relatively non-rotatably and axially movably supported by one of said plate and said drive member.

13. The torque converter according to claim 12, wherein
said piston and said plate form a pressure space therebetween, and said lockup device further includes a seal mechanism providing an axial seal between said inner peripheral surface of said piston and said one of said plate and said drive member.

14. The torque converter according to claim 11, wherein
said driven member is provided with a window with said torsion spring being disposed in said window, said drive member being formed of a pair of circular plates arranged on axially opposite sides of said driven member and supporting said torsion spring, and said driven member has a circumferentially extending recess with a fixing member located within said recess for fixing said pair of circular plates together and for limiting a relative rotation between said drive and driven members when said fixing member comes into contact with a circumferential end of said recess.

15. A torque converter adapted to be used to transmit torque from a power input shaft to an output shaft, said torque converter comprising:

a front cover being adapted to be coupled to the power input shaft, said front cover being provided at an inner side with a friction surface;

an impeller connected to said front cover to form a hydraulic chamber together with said front cover;

a turbine disposed opposite said impeller and disposed inside said hydraulic chamber, said turbine being adapted to be coupled to the output shaft, said front cover and said turbine forming a space therebetween;

a stator disposed between said impeller and said turbine; and a lockup device disposed in said space for mechanically engaging and disengaging said front cover with respect to said turbine, said lockup device including a plate disposed adjacent a friction surface of the front cover, a damper mechanism arranged to elastically couple said plate and the turbine in a rotating direction, said damper mechanism having a drive member for receiving a torque from said plate, a disk-like driven member for outputting the torque to the turbine, and at least one torsion spring for elastically coupling said drive member and said driven member together in the rotating direction, an annular piston adapted to move axially in said space in accordance with pressure changes in said space, and disposed on a side of said plate away from the friction surface of the front cover, said piston having an inner peripheral surface relatively rotatably and axially movably supported by an outer peripheral surface of said driven member, and a seal mechanism disposed between said outer peripheral surface of said driven member and said inner peripheral surface of said piston for sealing spaces on axially opposite sides from each other.

16. The torque converter according to claim 15, wherein said outer peripheral surface of said driven member has an annular groove, and said seal mechanism has an annular seal member disposed in said groove for contacting said inner peripheral surface of said piston.

17. The torque converter according to claim 16, wherein said driven member is provided with a window with said torsion spring being disposed in said window, said drive member being formed of a pair of circular plates arranged on axially opposite sides of said driven member and supporting said torsion spring.

18. The torque converter according to claim 17, wherein said driven member has a circumferentially extending recess with a fixing member located within said recess for fixing said pair of circular plates together and for limiting a relative rotation between said drive and driven members when said fixing member comes into contact with a circumferential end of said recess.

19. The torque converter according to claim 15, wherein said driven member is provided with a window with said torsion spring being disposed in said window, said drive member being formed of a pair of circular plates arranged on axially opposite sides of said driven member and supporting said torsion spring.

20. The torque converter according to claim 19, wherein said driven member has a circumferentially extending recess with a fixing member located within said recess for fixing said pair of circular plates together and for limiting a relative rotation between said drive and driven members stops when said fixing member comes into contact with a circumferential end of said recess.

* * * * *